US012795575B2

(12) United States Patent
Logothetis et al.

(10) Patent No.: US 12,795,575 B2
(45) Date of Patent: Nov. 10, 2026

(54) TIMING ADJUSTMENT WITHIN A WIRELESS COMMUNICATION SYSTEM

(71) Applicant: AIRSPAN IP HOLDCO LLC, Boca Raton, FL (US)

(72) Inventors: Andrew Logothetis, High Wycombe (GB); Venkateswarlu Katepalli, Slough (GB); Honey Kanwar Singh Sarao, Slough (GB); Jianling Chen, Ruislip (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 345 days.

(21) Appl. No.: 18/414,673

(22) Filed: Jan. 17, 2024

(65) Prior Publication Data

US 2024/0292362 A1 Aug. 29, 2024

(30) Foreign Application Priority Data

Feb. 24, 2023 (GB) ..................................... 2302666

(51) Int. Cl.
*H04W 56/00* (2009.01)
*H04W 74/08* (2009.01)
*H04W 74/0833* (2024.01)

(52) U.S. Cl.
CPC ... *H04W 56/0055* (2013.01); *H04W 74/0833* (2013.01); *H04W 74/0866* (2013.01)

(58) Field of Classification Search
CPC ......... H04W 56/0055; H04W 74/0833; H04W 74/0866; H04W 56/0045; H04L 5/0005
See application file for complete search history.

(56) References Cited

U.S. PATENT DOCUMENTS

2018/0167936 A1 6/2018 Quan et al.
2019/0342845 A1 11/2019 Laselva et al.
(Continued)

FOREIGN PATENT DOCUMENTS

EP 3720011 A2 10/2020
EP 3720011 A3 12/2020
(Continued)

OTHER PUBLICATIONS

GB Search Report from GB2302656.0 dated Sep. 21, 2023, 5 pages.
(Continued)

*Primary Examiner* — Dady Chery
(74) *Attorney, Agent, or Firm* — Haynes Beffel & Wolfeld LLP; Andrew L. Dunlap; Jason Liao

(57) ABSTRACT

A base station apparatus comprises antenna circuitry to transmit messages to and receive messages from a target communication apparatus. The base station apparatus comprises circuitry to determine an indication of a propagation delay in messages sent between the base station apparatus and the target communication apparatus, and circuitry to determine a time adjustment to be communicated to the target communication apparatus based on the indication of the propagation delay. The time adjustment is calculated such that when an uplink message to which the time adjustment has been applied is received at the base station apparatus, a given boundary between temporal segments in the received uplink message aligns with a reference boundary selected in dependence on which of a plurality of defined ranges the indication of the propagation delay falls within.

20 Claims, 16 Drawing Sheets

(56) References Cited

U.S. PATENT DOCUMENTS

| | | | | |
|---|---|---|---|---|
| 2021/0352606 | A1* | 11/2021 | Hosseinian | H04W 56/006 |
| 2022/0007323 | A1* | 1/2022 | Li | H04B 7/1851 |
| 2022/0022152 | A1 | 1/2022 | Liu et al. | |
| 2022/0078738 | A1* | 3/2022 | Zhang | H04B 7/0696 |
| 2023/0046730 | A1* | 2/2023 | Peng | H04W 56/0045 |
| 2023/0051034 | A1* | 2/2023 | Ibrahim | H04W 56/0045 |
| 2024/0007980 | A1* | 1/2024 | Guignard | H04W 56/0045 |
| 2024/0357533 | A1* | 10/2024 | Jacobsen | H04W 56/0065 |

FOREIGN PATENT DOCUMENTS

| | | | |
|---|---|---|---|
| EP | 4068868 | A1 | 10/2022 |
| WO | 2022082662 | A1 | 4/2022 |
| WO | 2022083705 | A1 | 4/2022 |
| WO | 2022207370 | A1 | 10/2022 |
| WO | 2023122400 | A1 | 6/2023 |

OTHER PUBLICATIONS

GB Search Report from GB2302666.9 dated Jul. 26, 2023, 3 pages.

EP Extended Search Report from EP24152347.1-1206 dated Jul. 16, 2024, 8 pages.

EP Extended Search Report from EP24152362.0-1206 dated Jul. 16, 2024, 12 pages.

* cited by examiner

Uplink and downlink frame timing. Range 90 km. STA = 1154

Uplink and downlink frame timing. Range 125 km. STA = -321.

Uplink and downlink frame timing. Range 200 km. STA = 641.

Uplink and downlink frame timing. Range 260 km. STA = -513.

Uplink and downlink frame timing. Range 300 km. STA = 0.

Uplink and downlink frame timing. Range 400 km. STA = 1282.

TIMING ADJUSTMENT WITHIN A WIRELESS COMMUNICATION SYSTEM

BACKGROUND

Messages sent between a base station and a communication device encounter a delay between the sending and receipt of the message due to the time taken for messages to travel between the devices. It is desirable to mitigate the effects that this propagation delay has on communication between devices. It is desirable to provide effective mitigation of the effects of the propagation delay even as the distance between devices, and therefore the propagation delay, increases, in order to enable effective long range communication between a base station and a communication device.

SUMMARY

In one example arrangement, there is provided a base station apparatus, comprising:

antenna circuitry configured to, during a communication session, transmit downlink messages to a target communication apparatus and receive uplink messages from the target communication apparatus, wherein the downlink and uplink messages comprise temporal segments;

propagation delay determination circuitry configured to determine an indication of a propagation delay in messages sent between the base station apparatus and the target communication apparatus based on a request received from the target communication apparatus requesting to initiate a communication session with the base station apparatus; and time adjustment determination circuitry configured to determine a time adjustment to be communicated to the target communication apparatus in response to the request, wherein the time adjustment is to be applied to uplink messages by the target communication apparatus, and the time adjustment is determined based on the indication of the propagation delay such that when an uplink message to which the time adjustment has been applied is received at the base station apparatus, the boundaries between temporal segments in the received uplink message align with reference boundaries; wherein the time adjustment determination circuitry is arranged to determine the time adjustment such that the reference boundary that a given boundary within the uplink message to which the time adjustment has been applied aligns with is dependent on which of a plurality of defined ranges the indication of the propagation delay falls within.

In a further example arrangement, there is provided a method for a base station apparatus, comprising:

during a communication session, transmitting downlink messages to a target communication apparatus and receiving uplink messages from the target communication apparatus with antenna circuitry, wherein the downlink and uplink messages comprise temporal segments;

determining an indication of a propagation delay in messages sent between the base station apparatus and the target communication apparatus based on a request received from the target communication apparatus requesting to initiate a communication session with the base station apparatus; and determining a time adjustment to be communicated to the target communication apparatus in response to the request, wherein the time adjustment is to be applied to uplink messages by the target communication apparatus, and the time adjustment is determined based on the indication of the propagation delay such that when an uplink message to which the time adjustment has been applied is received at the base station apparatus, the boundaries between temporal segments in the received uplink message align with reference boundaries; wherein the time adjustment is determined such that the reference boundary that a given boundary within the uplink message to which the time adjustment has been applied aligns with is dependent on which of a plurality of defined ranges the indication of the propagation delay falls within.

In a still further example arrangement, there is provided a base station apparatus, comprising:

communication means for transmitting, during a communication session, downlink messages to a target communication apparatus and for receiving, during the communication session, uplink messages from the target communication apparatus, wherein the downlink and uplink messages comprise temporal segments;

propagation delay determining means for determining an indication of a propagation delay in messages sent between the base station apparatus and the target communication apparatus based on a request received from the target communication apparatus requesting to initiate a communication session with the base station apparatus; and time adjustment determining means for determining a time adjustment to be communicated to the target communication apparatus in response to the request, wherein the time adjustment is to be applied to uplink messages by the target communication apparatus, and the time adjustment is determined based on the indication of the propagation delay such that when an uplink message to which the time adjustment has been applied is received at the base station apparatus, the boundaries between temporal segments in the received uplink message align with reference boundaries; wherein the time adjustment determining means is arranged to determine the time adjustment such that the reference boundary that a given boundary within the uplink message to which the time adjustment has been applied aligns with is dependent on which of a plurality of defined ranges the indication of the propagation delay falls within.

BRIEF DESCRIPTION OF THE FIGURES

Further aspects, features and advantages of the present technique will be apparent from the following description of examples, which is to be read in conjunction with the accompanying drawings, in which.

DETAILED DESCRIPTION

Figure 1:
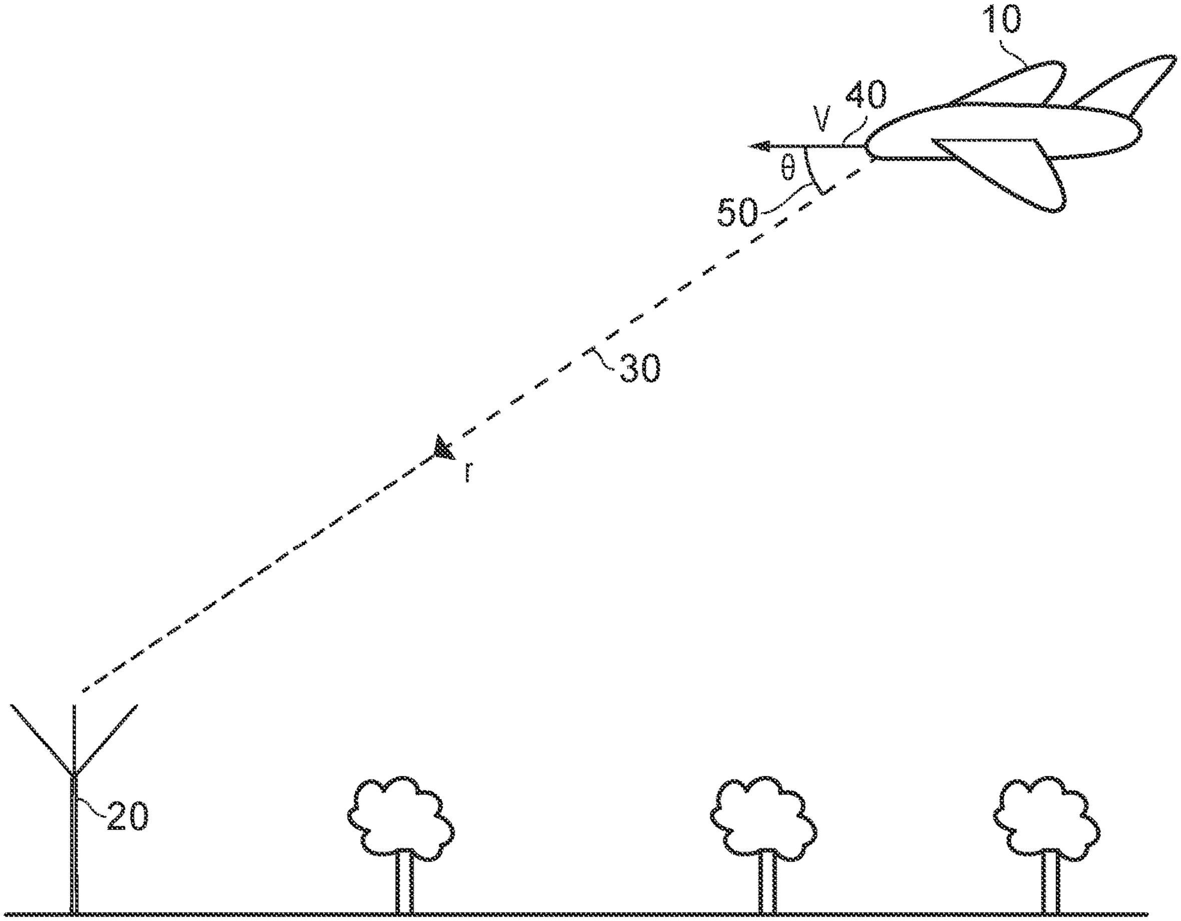
FIG. 1 illustrates a communication system comprising a base station apparatus and a target communication apparatus.

As introduced above, messages sent between a base station and a communication device encounter a delay between the sending and receipt of the message due to the time taken for messages to travel between the devices. This propagation delay will affect messages sent from the base station to the communication device (downlink messages) and messages sent to the base station from the communication device (uplink messages). The larger the distance between the base station and the communication device, the longer the propagation delay will be due to the finite speed at which messages travel. Messages sent between the base station (BS) and communication devices (such as user equipment (UE) or intermediate devices between a BS and a UE) are often separated into temporal segments. For example, a message according to a 3GPP Standard such as LTE or 5G NR may be separated into frames and subframes. A base station may send and receive messages at certain times based on the boundaries between the segments in uplink and downlink messages. For example, a frequency-division duplexing (FDD) base station may send and receive messages at the same time and may operate to align segments in the uplink and downlink messages for timing purposes, so that the base station receives uplink messages at expected times. A time-division duplexing (TDD) base station may send and receive messages at different times so that uplink and downlink messages do not overlap at the base station, for example if the antenna is only able to receive or transmit at a given time, and may align boundaries between segments in uplink and downlink messages to do so. It will be appreciated that the alignment may not need to be exact, but an alignment to within a particular tolerance. Therefore, the base station may transmit messages such that the segments in the transmitted messages align with segments in messages it expects to receive from a communication device.

However, since the arrival time of messages is dependent on the distance between the base station and a communication device, boundaries between segments in received uplink messages may be shifted by an amount which depends on the location of the communication device, and alignment between messages sent to the communication device and messages received from the communication device may be disrupted. Furthermore, a base station may communicate with several target devices at once. Since the devices may be located at different distances from the base station, messages sent by each device to the base station may be delayed by differing amounts and therefore the boundaries between segments in uplink messages received from different devices may be shifted by different amounts. Not only does this make it difficult to align all uplink messages received at the base station with the downlink messages sent by the base station, this may also lead to interference between different uplink messages received at the base station, since the segments in the different uplink messages may not be aligned with each other. It would be desirable to avoid interference between uplink and downlink messages, and interference between different uplink messages, at the base station.

A base station apparatus according to the present technique therefore provides propagation delay determination circuitry configured to determine an indication of a propagation delay in messages sent between the base station apparatus and a target communication apparatus. The indication of the propagation delay could take a variety of forms, for example, an indication of a time representing the propagation delay or an indication of a distance corresponding to the propagation delay. This determination can be made based on a request received from the target communication apparatus requesting to initiate a communication session with the base station apparatus. The timing of the request may be indicative of the propagation delay, since the request has itself travelled between the communication device and the base station. For example, the request may have been sent by the communication device at a time known to the propagation delay determination circuitry, and the delay between a predicted time of arrival and the time of actual arrival of the request may be indicative of the propagation delay in messages sent between the base station apparatus and the target communication apparatus. The indication of a propagation delay may be a round trip propagation delay, which is a time equal to twice the measured delay of the request, and is equivalent to the combined delay of one downlink message and one uplink message.

The apparatus further provides time adjustment determination circuitry configured to determine a time adjustment to be communicated to the target communication apparatus in response to the request. For example, the base station apparatus may use antenna circuitry to transmit a response to the request, wherein the response includes a value indicating the time adjustment. The time adjustment is to be applied to uplink messages by the target communication apparatus by shifting the time of transmission of the uplink messages by an amount equal to the time adjustment. The time adjustment is determined based on the indication of the propagation delay such that when an uplink message to which the time adjustment has been applied is received at the base station apparatus, the boundaries between temporal segments in the received uplink message align with reference boundaries. Therefore, the timing of messages sent by the communication apparatus may be adjusted based on the measured propagation delay in a way which causes boundaries in the uplink messages received by the base station to align with reference boundaries. As will be discussed in further detail below, shifting messages by an amount which depends on the propagation delay they are expected to experience enables interference to be reduced at the base station, both between uplink and downlink messages, and between uplink messages arriving from different communication apparatuses.

In one example technique, the time adjustment may be calculated such that a given boundary in a received uplink message aligns with a given reference boundary. Therefore, the time adjustment could be calculated so that a given segment of the uplink message arrives at the same time regardless of the distance between the base station and a target communication apparatus. For example, when the time adjustment is applied with respect to the boundaries between downlink messages as received at the target communication device, the time adjustment could be a timing advance equal to a round trip propagation delay so that, from the perspective of the base station, it would appear as though the target communication apparatus is at zero distance from the base station, and messages encounter no propagation delay at all. Whilst the uplink message itself will only encounter half of the round-trip propagation delay, if the adjustment is applied to a message which has already been delayed by half of the round-trip propagation delay then a full round-trip propagation delay will eliminate the effect of propagation delay. It will be appreciated that based on the particular implementation, different time adjustments may be applied to mitigate the effect of propagation delay but in each case the delay encountered by the uplink message will be half of the round-trip propagation delay.

However, the inventors have recognised that this technique encounters problems at large distances. At large distances, with large propagation delays, the target communication device may be required to advance messages by a large time adjustment so that they are sent considerably before the time they would be sent were no time adjustment to be applied. However, circuitry applying the timing advance may have a maximum time adjustment limit beyond which it can advance the uplink messages no further. In addition, the response sent by the base station to the target communication apparatus which includes the time adjustment may need to adhere to a particular format. The format may restrict the maximum size of the time adjustment, such that larger timing adjustments would be too large to encode in the format of the response. These issues mean that applying a time advance to align a given boundary in an uplink message with a given reference boundary is limited by range. Beyond a maximum range, circuitry in the target communication apparatus may be unable to apply a large enough timing advance to cause the two given boundaries to align, and/or the base station apparatus may be unable to communicate a large enough timing advance to the target communication apparatus.

The inventors recognised that the problems discussed above could be mitigated if a time adjustment were selected so that a given boundary in the uplink message to which the time adjustment has been applied aligns with a reference boundary which is not a predetermined reference boundary, but is a reference boundary selected in dependence on which of a plurality of defined ranges the indication of the propagation delay falls within. For example, the time adjustment could be selected so that a given boundary in the uplink message aligns with any of a first, second, third, and so on reference boundary depending on the size of the indication of the propagation delay. Then, rather than making the time adjustment larger and larger the further the target communication apparatus is from the base station in an effort to still align with a given reference boundary, a different, smaller, time adjustment could be applied which instead aligns an uplink message with a later reference boundary. As discussed further below, this technique can be used at any range since it can be used with a finite maximum time adjustment, and therefore lifts the restriction on maximum range which the alternative technique could impose.

This technique may appear counter-intuitive since it may lead to messages being received an integer number of segments later than they would be received if there were no propagation delay. Whilst the alternative technique discussed above aims to cause messages to arrive as if there were no propagation delay at all, the inventors have determined that to avoid interference between messages it is sufficient that boundaries between segments align, even if the segments are received later than expected.

In some examples, the defined ranges for the indication of the propagation delay may each correspond to one of the reference boundaries. In addition, adjacent ranges may correspond to adjacent reference boundaries such that first and second time adjustments determined for indications of the propagation delay falling within adjacent defined ranges may be determined such that the given boundary within an uplink message to which the first time adjustment has been applied and the given boundary within an uplink message to which the second time adjustment has been applied align with adjacent reference boundaries.

Each indication of a propagation delay may be associated with a time adjustment, and the association may be continuous within a given range. Between adjacent ranges there may be a discontinuity between the time adjustments associated with successive indications of the propagation delay. In some examples, the size of the ranges is not limited. As long as the ranges are finite, an advantage is provided over the technique in which time adjustments are calculated to align with a single reference boundary. However, smaller ranges may mean that a smaller time adjustment needs to be communicated to a target communication apparatus and applied by the target communication apparatus, which means that the circuitry requirements are reduced and less encoding space is used to communicate the timing adjustment. In some examples, the smallest range which still enables alignment of every message with a reference boundary may be used, which is provided when the difference between a minimum time adjustment corresponding to the smallest indication of the propagation delay in a given defined range and a maximum time adjustment corresponding to the largest indication of the propagation delay in the given defined range is equal to the length of one temporal segment.

The limits between ranges, that is the values of the indication of the propagation delay which lie at the point between two ranges, may in some cases be adjusted freely. In some examples, the limits may be set at periodic values of the indication of the propagation delay starting from zero based on the selected size of the range. However, this is not necessary and in particular the ranges do not need to be the same size as each other. Since each range may correspond with aligning a given boundary in an uplink message with a particular reference boundary, devices having propagation delays falling within different ranges may have their uplink messages aligned with different reference boundaries. If a particular device lies at a distance having a propagation delay which is on the limit between two ranges, and which moves between the two ranges, then as the device moves over the limit there may be a gap or overlap in the communication between devices as the uplink messages begin to be aligned with a later or earlier reference boundary. If the target device fails to decode a timing advance message, for example, then the target device may transmit in an incorrect uplink slot for a short time after the particular reference boundary has changed as it is attempting to align with an incorrect reference boundary. The incorrect uplink slot may have been allocated to a different user, so the transmitted information may not be correctly received by the base station and some information could be lost. This may be detected and corrected by the base station (for example, by re-triggering a Random Access procedure to recalculate a timing adjustment to be transmitted to the target device), but the correction will not be immediate and undesirable loss of information may occur as a result of the device moving between two ranges. Hence, it can be useful if a device is located at a position which is associated with a propagation delay that does not fall near to a limit between ranges, so that movement of the device can occur whilst the device remains in the same range. In cases where there are several communication devices communicating with one base station, it may not be possible to ensure that this is true for every device if the same ranges are used for every device. However, since the range limits may be moved, in some examples the range limits of the defined ranges may be set in dependence on an estimated distribution of target communication apparatuses.

In particular, the range limits may be selected to seek to maximise the number of target communication apparatuses for which the indication of the propagation delay falls within a single range having regard to the estimated distribution of target communication apparatuses. The range limits may be therefore selected to minimise the number of target communication apparatuses located at a position which is near to a boundary between ranges of the propagation delay. The estimated distribution of target communication apparatuses could be determined by the base station apparatus based on observed indications of the propagation delay or may be predetermined and provided to the base station apparatus. The estimated distribution of target communication apparatuses may vary over time, and therefore may be updated periodically.

In some examples, the time adjustment may be entirely positive (a timing advance). That is, the time adjustment may be a shift which causes the uplink messages to which the time adjustment is applied to be sent earlier than if no time adjustment were applied. Larger positive time adjustments cause messages to be shifted further forwards, and therefore sent earlier, than smaller positive time adjustments. As long as the range of time adjustments is at least as large as the time duration of one segment, then a time adjustment can be used to align uplink messages with any reference boundary. This can allow uplink messages which are sent by devices at any range to be aligned with reference boundaries at a base station, which avoids the problems associated with attempting to align to a single reference boundary, particularly signalling and applying large time advances.

However, the inventors have realised that when it is acceptable to align a given uplink boundary with a later reference boundary, it is possible to apply a negative time adjustment. A negative time adjustment corresponds to delaying the transmission of uplink messages so they are sent later than if no time adjustment were applied. Applying a negative time adjustment may cause an uplink message to align with reference boundaries at the base station. However, this is highly counter-intuitive, since one would usually expect that the time adjustment should be made to mitigate the effect of propagation delay. A negative time adjustment acts to increase the delay that a given message experiences, which therefore appears to be counterproductive since it has a completely opposite effect to a typical intention of a time adjustment. However, since interference can be mitigated as long as boundaries in an uplink message align with any reference boundaries, interference can be mitigated even by applying a negative time adjustment.

A negative time adjustment can be useful because it can enable a smaller magnitude of time adjustment to be applied to uplink messages. Rather than only advancing uplink messages to align with a reference boundary, selectively advancing or retarding uplink messages to align with reference boundaries which are closer in time to boundaries between segments in uplink messages received at a base station, regardless of whether the reference boundaries are earlier or later than the boundaries in the uplink messages, can allow smaller magnitude time adjustments to be used to achieve alignment between messages. For example, at some distances the magnitude of a time retard for achieving alignment at the base station may be smaller than the magnitude of a time advance. This can reduce the complexity of circuitry for applying the time adjustment at the target communication apparatus since the amount that a message needs to be adjusted by can be reduced. In particular, some hardware may only be able to apply a timing adjustment up to a maximum magnitude, for example a maximum value imposed by a Standard. In particular, this timing advance may be smaller than the size of a segment in the messages. Rather than updating the hardware to allow a larger advance to be applied, the existing hardware may in some cases be configured to apply a timing retard in addition to a timing advance, whilst keeping the maximum magnitude of adjustment unchanged. Therefore, the difference between the minimum and maximum timing adjustment can be increased to enable the present technique to be implemented without increasing the magnitude of time adjustment which can be applied, by configuring the circuitry to apply a timing retard in addition to a timing advance.

In addition, the use of a negative time adjustment can enable the ranges to be moved with increased freedom.

As discussed above, the maximum value of time adjustment in some apparatus may be a value imposed by a Standard. For example, it may be set according to the maximum value of a timing advance representable in a Random Access Response (RAR) message according to a 3GPP Standard such as LTE (4G) or NR (5G). Therefore, the maximum positive time adjustment which can be determined by the time adjustment determination circuitry may be set equal to the largest timing advance representable in an encoding of the RAR message. This may enable hardware configured to comply with the 3GPP Standard to be reused to apply the technique described above.

To enable communication between devices made by different manufacturers, the request received from the target communication apparatus and the response to the request may both adhere to message formats defined by a Standard (in particular a 3GPP Standard). For example, the time adjustment may be signalled in a RAR message according to a 3GPP Standard such as LTE (4G) or NR (5G). The response message may have a field which can represent a timing advance between 0 and a threshold value. However, the response message may not have sufficient room for a spare bit in addition to representing the threshold value, and therefore there may not be encoding space in the timing advance field of the response message to encode a negative timing adjustment having a magnitude up to the threshold value. However, there may be sufficient encoding space, between the threshold value represented by the response message and the maximum value representable in a field having the number of bits used to represent the threshold value, to represent the negative timing adjustment values. Therefore, the base station may be configured to encode a negative time adjustment value as a positive time adjustment having a magnitude larger than the threshold value. This means that the response message is backwards compatible, since values lower than the threshold value represent the same positive time adjustment values as if no negative time adjustment were encoded, however the message is also able to reuse the spare encoding space above the threshold value to represent the negative time adjustments. Therefore, an existing message format can be used to communicate a negative timing adjustment.

The negative time adjustment may be communicated in further ways, however. In particular, if the field typically used to represent the timing advance does not have a spare bit to use as a sign bit, then in some message encodings having a separate unused bit, the unused bit can be considered to be an additional bit and used to represent the sign of the value in the timing advance field. Therefore, the timing advance field can be used to represent a magnitude of a timing adjustment and an additional bit can be used to represent a sign of the timing adjustment.

Alternatively, the additional bit can be considered to be appended to the timing advance field and the entire field including the additional bit can be used to represent the timing advance in two's complement.

In both cases, the message format is backwards compatible since the positive timing adjustment would be encoded in the message in the same way whether or not a negative timing advance could be applied.

For the additional bit, a reserved bit in the format of the RAR message according to a 3GPP standard could for example be used.

In some examples, the time adjustment determination circuitry is arranged to determine a time adjustment which is periodic with respect to the indication of the propagation delay. That is, the same time adjustment is calculated for values of the indication of the propagation delay separated by an amount equal to the period. Therefore, even as the indication of the propagation delay increases due to a large separation between the base station and the target communication apparatus, the time adjustment remains within a finite range of values. The periodicity may be selected such that the time adjustment remains within a range equal to the length of one segment of a message. A time adjustment which is periodic with respect to the indication of the propagation delay can be achieved when one no longer attempts to align with one particular reference boundary and instead decides to align with any reference boundary, and allows the problem of extremely large time adjustments to be avoided.

The reference boundaries may be freely chosen by the base station apparatus. However, when the antenna circuitry is configured to communicate with two or more target communication apparatuses, it is advantageous for the same reference boundaries to be used to determine a time adjustment for each target communication apparatus. This means that the incoming messages from different target communication apparatuses will be adjusted to align with the same reference boundaries, and therefore align with each other. This reduces the interference between uplink messages received at the base station from different target communication apparatuses.

The reference boundaries may also be selected to depend on the boundaries between segments in downlink messages transmitted by the base station apparatus. In particular, the reference boundaries may be selected to align with the boundaries between temporal segments in the downlink messages. In certain base stations such as Time-Division Duplexing (TDD) base stations, aligning the reference boundaries with the downlink boundaries can be useful to avoid overlap between downlink messages and uplink messages. In TDD, the antenna may be configured to either transmit downlink messages (transmitted by the BS in transmission segments) or receive uplink messages (received by the BS in receiving segments), but not both at once. If the reference boundaries were not aligned with the downlink boundaries, then uplink messages could arrive as downlink messages are being transmitted, which could cause loss of information as the antenna may not be configured to receive the uplink messages. However, by aligning reference boundaries so that segments do not overlap, and assigning certain segments to uplink and certain segments to downlink, the risk of loss of information may be reduced. In other base stations, such as Frequency-Division Duplexing (FDD) base stations, alignment between uplink and downlink segments may be desirable to ensure that uplink messages arrive at the correct time as expected by the base station.

The time adjustment may be applied by the target communication apparatus in several ways. For example, it could be applied with respect to periodic reference transmission times based on a clock or other timing circuitry. However, in one example the time adjustment is applied as an offset with respect to boundaries in a downlink message received at the target communication apparatus. That is, the boundaries in a downlink message received at the target communication apparatus (which will have been delayed since the downlink message was transmitted by the base station) are treated as intermediate reference boundaries from which the timing adjustment is applied. This means that the timing at which the timing adjustment is applied ultimately depends on both the downlink boundaries as communicated by the base station, and the propagation delay, which are both times known to the base station. Therefore, the timing adjustment can be determined by the base station apparatus such that uplink messages arrive at a given time, since the factors affecting time of arrival are known to the base station.

As discussed above, in some examples, the propagation delay determination circuitry is configured to determine an indication of the propagation delay based on an elapsed time between a reference time and receipt of the request. However, alternative methods for determining the propagation delay may be possible, including determinations made based on a measured distance of the target communication apparatus with respect to the base station, such as by reference to co-ordinates of both apparatuses. An indication of the propagation delay may itself be a measurement of the distance, the indication of the propagation delay may be a time calculated based on the distance, or the indication of the propagation delay may be some other value based on the measurement of the distance.

As mentioned above, the temporal segments into which the uplink and downlink messages are split may in one example implementation be sub-frames of messages according to a 3GPP Standard. However, in other examples the temporal segments may for example be frames of messages.

Whilst the type of target communication apparatus is not particularly limited by the above described technique, the technique may be particularly useful when the target communication apparatus is mounted on a moving vehicle, for example an aeroplane in an air-to-ground (ATG) communication network. This is because the above technique may increase the maximum range between the base station and target communication apparatus, enabling a moving target communication apparatus to remain connected with a single base station for longer, which reduces the burden of handing over communication to different base stations during a journey. The increased range also reduces the number of base stations which are required to cover a particular area, which can reduce installation and maintenance costs in rolling out communication networks to remote areas to support communication with moving vehicles, such as networks for supporting communication with aeroplanes overflying remote areas.

Particular examples will now be described with reference to the figures.

In modern communications systems, including those according to a 3GPP standard such as LTE (4G) or NR (5G), a target communication apparatus may communicate with a base station. The base station may communicate with several different target communication apparatuses. In one example system (an air-to-ground (ATG) system), the target communication apparatus is mounted on a moving vehicle such as an aeroplane and the base station is located at a fixed position on the ground. An example is shown in FIG. 1, in which a target device 10 mounted on an aeroplane is able to communicate with a base station 20. A network of ground terminals can be provided, enabling the target device 10 to connect to different ground terminals during a flight in order to seek to maintain a communication link that can be used to provide connectivity to passengers in the aircraft. The target communication apparatus may not itself be an item of user equipment (UE) and instead may connect the base station to several UEs on the aeroplane. However, in some examples the target communication apparatus is itself a UE. As shown in FIG. 1, the aircraft 10 is assumed to be travelling at a velocity 40, and has a relative separation 30 between it and the ground terminal that it is connected to. This relative separation can be specified as a vector, as can the velocity 40, and there will be an angular separation between the velocity vector and the relative separation vector, namely the angle 50 shown in FIG. 1.

Figure 2:
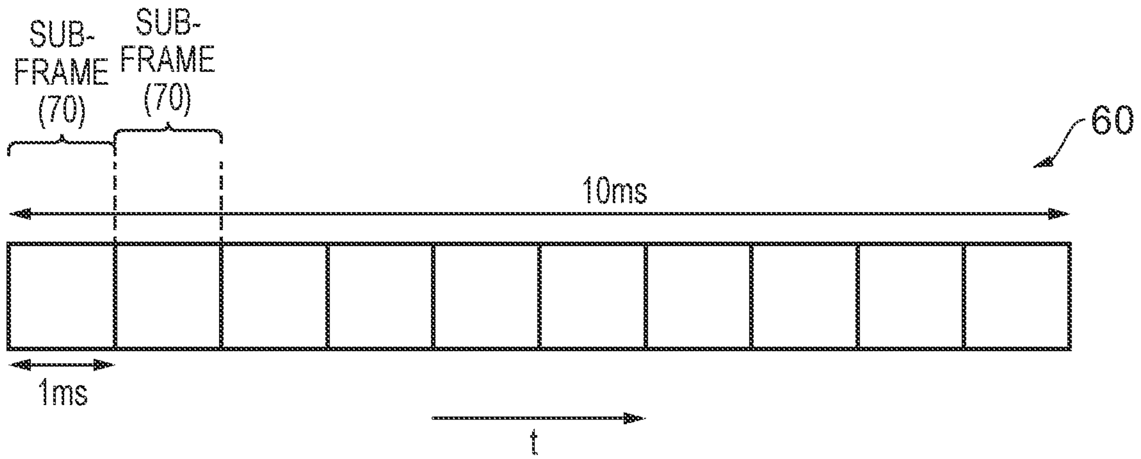
FIG. 2 illustrates frames and sub-frames of a message.

Messages sent between the target device 10 and the base station 20 may be separated into temporal segments. This is illustrated in FIG. 2, in which a message is separated into frames 60 and each frame may be separated into sub-frames 70. According to LTE and NR, the frame may have a length of 10 ms and comprise 10 sub-frames, each of length 1 ms. It will be appreciated that other message formats may be segmented in a similar way, and the techniques described herein will apply to those formats equally.

Figure 3:
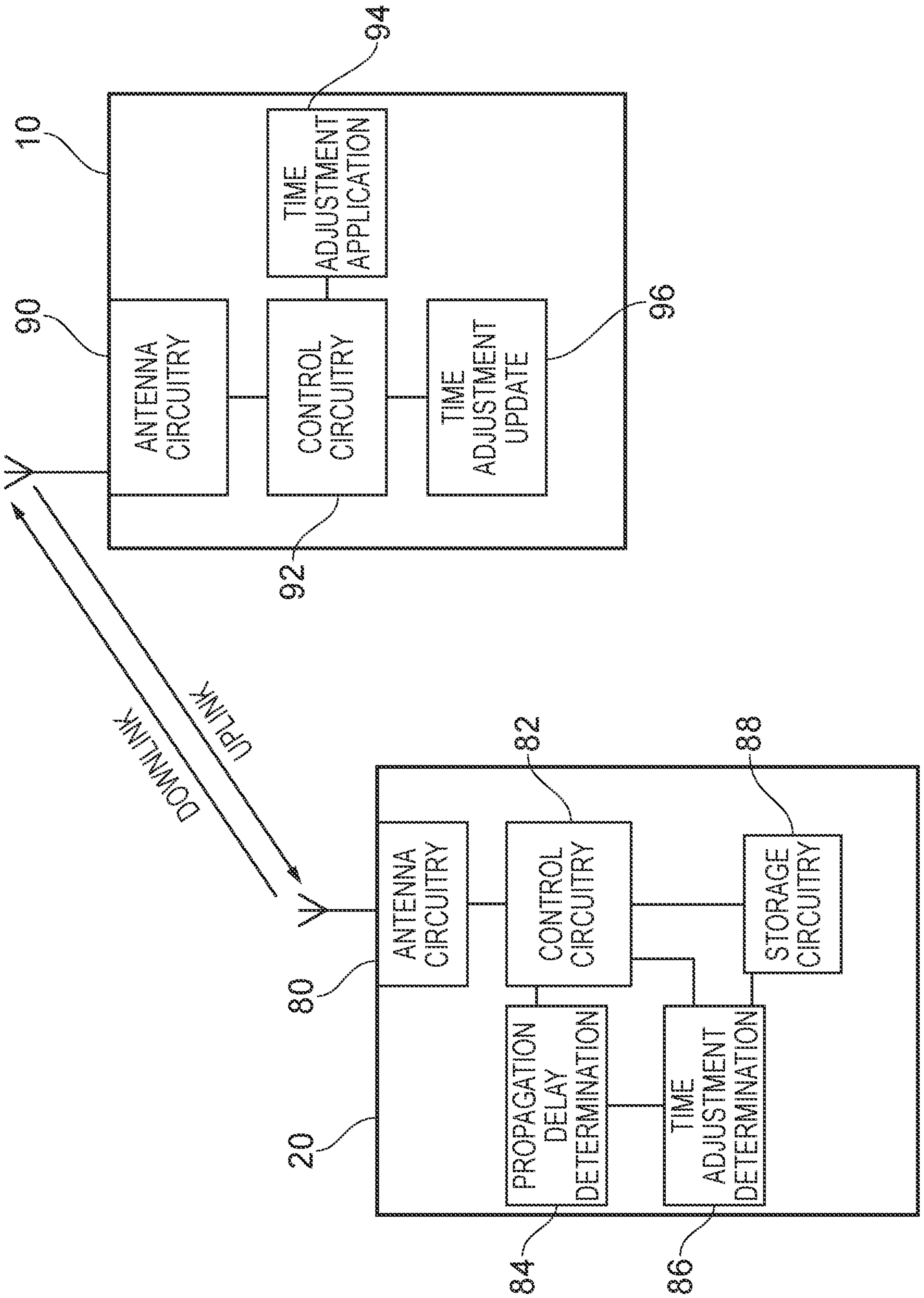
FIG. 3 illustrates a communication system comprising a base station apparatus and a target communication apparatus.

As shown in FIG. 3, the base station 20 comprises antenna circuitry 80. The antenna circuitry 80 communicates with antenna circuitry 90 at one or more target communication apparatuses 10. The communication comprises sending downlink messages from the base station 20 to the target device 10 and receiving uplink messages at the base station 20 from the target device 10. In frequency-division duplexing (FDD) the uplink and downlink messages may be transmitted and received simultaneously, using different frequency ranges for uplink and downlink messages. In time-division duplexing (TDD), the base station may receive uplink messages and transmit downlink messages at different times, in similar or the same frequency ranges. Messages between the base station 20 and target devices 10 will be delayed due to the time taken for the messages to travel the distance 30 separating the base station 20 and the target device 10. Larger separations will lead to larger propagation delays since the messages have to cover a larger distance. Since the uplink and downlink messages encounter a propagation delay, the time of arrival of the messages may be shifted with respect to the expected time of arrival if there were no propagation delay. This can cause the sub-frames in the received messages to be shifted by an amount depending on the propagation delay with respect to the sub-frames in the sent messages.

Figure 4:
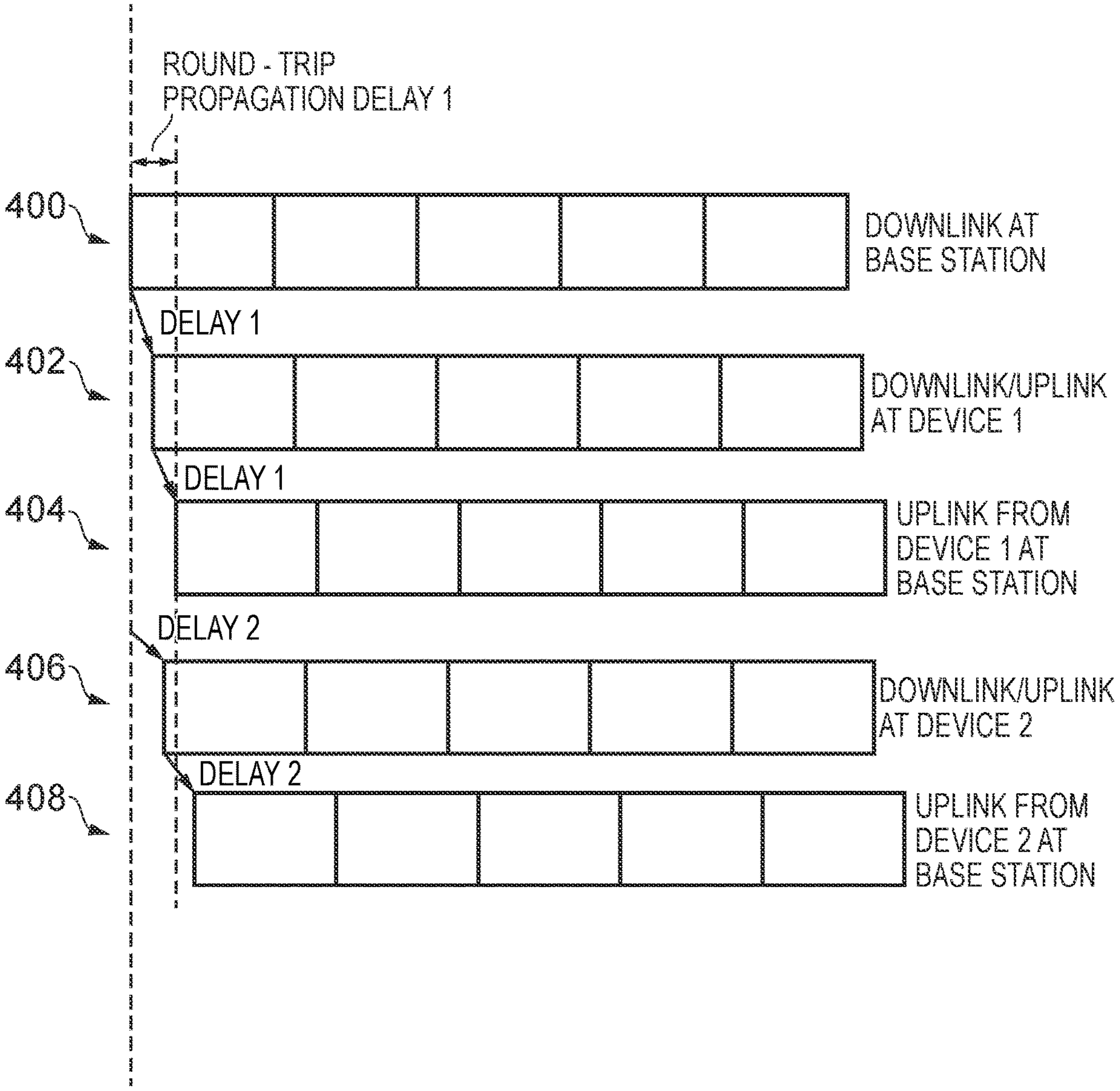
FIG. 4 illustrates the timing of uplink and downlink messages transmitted between a base station apparatus and a target communication apparatus.

This is illustrated in FIG. 4. The first row 400 illustrates a frame of a downlink message transmitted by a base station, at the base station 20. The second row 402 of FIG. 4 illustrates the same frame when received at a user device 10. It will be seen that the message has been delayed due to the time taken for the message to travel from the base station 20 to the user device 10. As illustrated in the third row 404 of FIG. 4, the same delay is encountered by an uplink message sent by the user device 10 to the base station 20. If uplink messages are transmitted from the user device 10 with boundaries between sub-frames aligned with downlink messages received at the user device 10, then when the uplink message is received by the base station, it has been delayed with respect to messages transmitted by the base station by a round-trip propagation delay equal to the sum of the propagation delay encountered by the downlink message and the uplink message. Rows 4 and 5 of FIGS. 4 (406 and 408) illustrate how this delay varies between devices located at different distances from the base station, with devices 1 and 2 being associated with different distances and therefore different delays 1 and 2.

The effect of the propagation delay is that uplink messages received at the base station do not align with downlink messages sent by the base station. That is, the boundaries between sub-frames in uplink and downlink messages do not align. In TDD systems this can cause issues as the antenna 80 may be configured at certain points in time to transmit downlink messages but not receive uplink messages, and therefore be unable to receive uplink messages from the target devices when they arrive during a time the antenna is configured for downlink communication. In FDD systems, unaligned boundaries between sub-frames can cause interference between downlink messages being transmitted by the base station 20 and uplink messages being received at the base station 20. Further, since uplink messages arriving from different target devices can be shifted by different amounts, the boundaries in the uplink messages do not align with each other and the different uplink messages can therefore also interfere.

Figure 7:
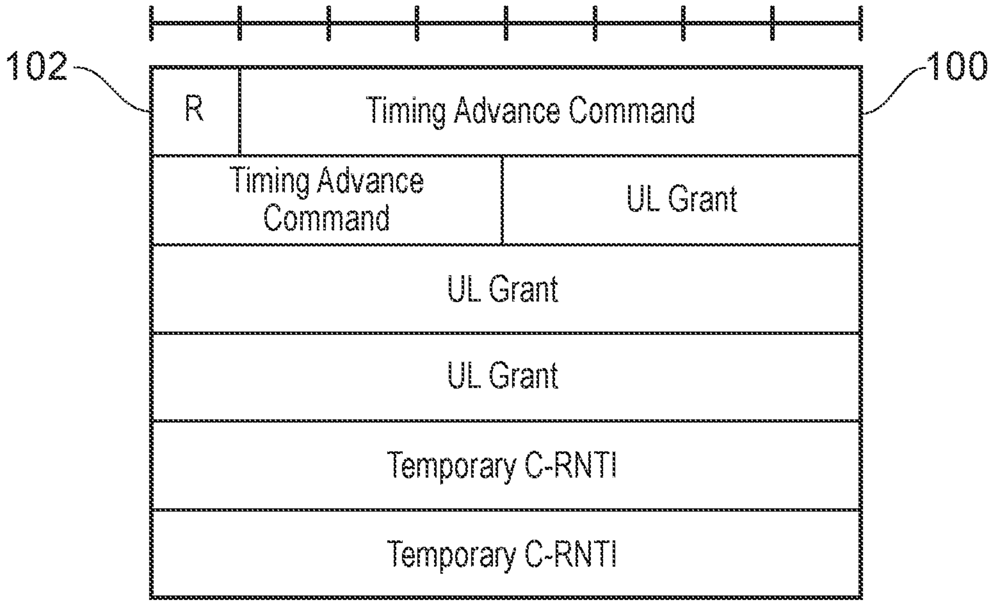
FIG. 7 illustrates a message format for signalling a time adjustment.

In one example technique, the effect of propagation delay can be reduced by applying a timing advance to uplink messages sent by the target devices. When the target device initiates a communication session, it may send a request to the base station 20. For example, the request may be a Physical Random Access Channel (PRACH) preamble according to a 3GPP standard. The timing of the PRACH may be predefined so that, when the base station 20 receives the PRACH, it can determine how much the PRACH message has been delayed by propagation. For example, the base station 20 may comprise propagation delay determination circuitry 84 for determining an indication of the propagation delay, such as a round-trip propagation delay time, based on the timing of receipt of the PRACH message and knowledge of a time at which an invite to send a PRACH was previously sent by the base station. The base station 20 may also comprise time adjustment determination circuitry 86 to calculate a timing advance based on the indication of the propagation delay. In some cases, the timing advance could be equal to the round-trip propagation delay time, for example. Under the control of control circuitry 82, the antenna circuitry 80 of the base station 20 may then communicate the timing advance to the target device 10. For example, the timing advance may be signalled in a Random Access Response (RAR) message (as illustrated in FIG. 7) having a timing advance field 100. The target device 10 may comprise time adjustment application circuitry 94 under the control of control circuitry 92 which is configured to apply the time adjustment to uplink messages sent by the target device 10, for example by applying the timing adjustment as an offset with reference to the boundaries between sub-frames in downlink messages received at the target device 10.

Figure 5:
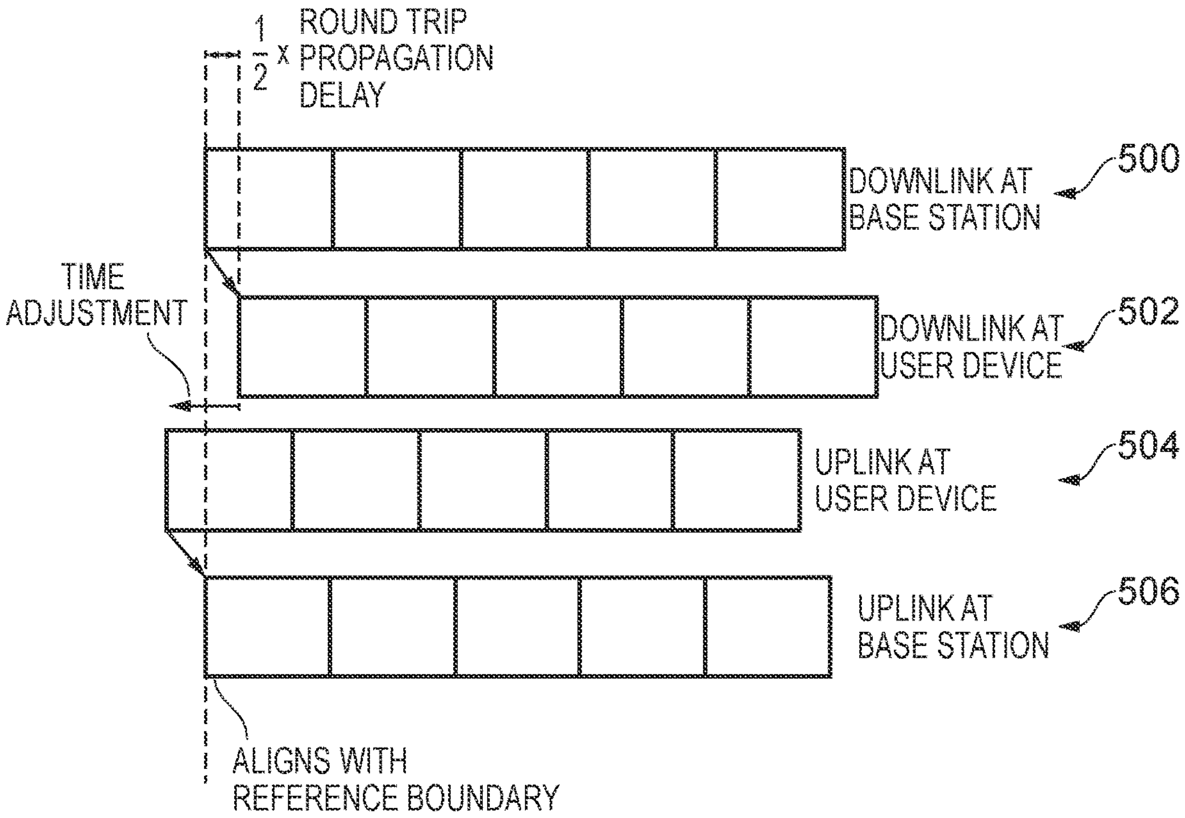
FIG. 5 illustrates a timing advance procedure for messages transmitted between a base station apparatus and a target communication apparatus.

FIG. 5 illustrates this procedure. Row 500 of FIG. 5 illustrates the timing of a downlink message transmitted by the base station 20, illustrating the boundaries between sub-frames. Row 502 of FIG. 5 illustrates the timing of the downlink message when received at the user device 10, delayed by half of the total round-trip propagation delay. The timing advance (e.g., the total round-trip propagation delay) is applied to uplink messages as an offset to the boundaries shown in row 502. Therefore, in row 504, the uplink message transmitted by the target device 10 is shown with a timing advanced with respect to the boundaries of row 502. This means that, when the uplink messages are received at the base station 20 (undergoing another delay of half the round-trip propagation delay on the journey) as shown in row 506, they arrive at the base station 20 with the boundaries between sub-frames in the received uplink message aligning with boundaries in downlink messages sent by the base station 20. This means that the risk of receiving uplink messages in a transmitting window is reduced (which may be particularly relevant in a TDD system where messages are unable to be simultaneously received and transmitted, although for other timing purposes may also be relevant in an FDD system). Since different timing advances can be communicated to different target devices, different time adjustments can be applied to uplink messages sent from different distances, which can cause uplink messages sent from different target communication devices 10 to align with each other at the base station 20. Therefore, interference between different uplink messages can also be reduced.

Figure 6:
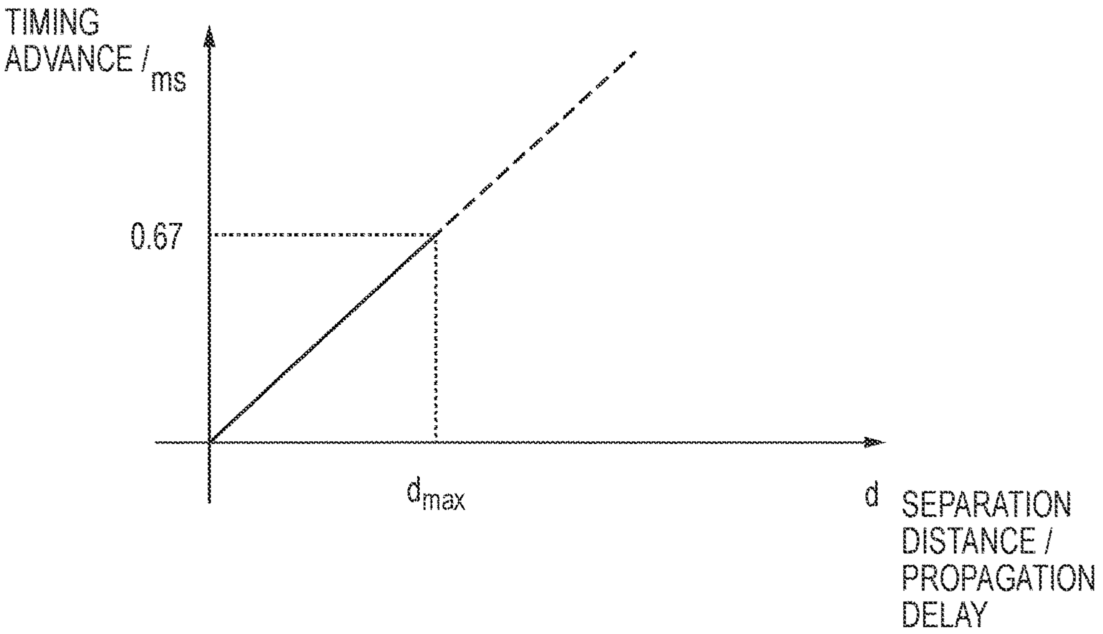
FIG. 6 shows a relationship between a separation distance and a timing advance.

FIG. 6 shows a relationship between distance of the target device from the base station 20 and the timing advance that may be applied so that boundaries in received uplink messages align with particular boundaries in the downlink messages at the base station 20. It will be appreciated that the separation distance 30 between the base station and the target communication apparatus is equivalent to a propagation delay since these values are related by a factor equal to the speed of transmission of the message. The timing advance shown in FIG. 6 may act to remove the effects of propagation delay entirely by advancing messages by an amount equal to the round-trip propagation delay time. It will be seen how, as separation distance 30 increases, the timing advance that should be communicated to the target device 10 and applied by the time adjustment application circuitry 94 increases. This can be problematic since the time adjustment application circuitry 94 may only be configured to apply a timing advance up to a certain maximum value. Any larger values may be too large for the hardware of the circuitry 94 to apply. In addition, the RAR message which communicates the timing advance to the target communication apparatus 10 may have an encoding according to a Standard which limits the maximum value of the timing advance. For example, a RAR message according to LTE may have an 11-bit timing advance command field. The 11 bits may be used to signal a value $T_A$ between 0 and 1282 according to the Standard. The variable $N_{TA}=T_A*16$. The actual timing advance applied by the timing advance application circuitry 94 may be calculated as: $T=N_{TA}*T_S$, wherein $$T_S = \frac{1}{30720} \text{ ms.}$$

This gives a maximum signalled time advance of 0.67 ms. If this is the maximum round-trip propagation delay, then the maximum range of communication according to this format is 100 km (200 km total round-trip distance), since larger distances are associated with timing advances that cannot be signalled to the target communication apparatus. Therefore, both the format of communication and the limitations of the timing advance application circuitry 94 may impose a maximum range of communication, since any larger range may require a timing advance that is too large to be signalled and/or applied. Even if the format of the RAR message allowed a larger advance to be signalled, this would still have a maximum at a certain point, beyond which the timing advance would be too large to be signalled and/or applied.

However, the inventors have recognised that the size limitations of timing advances need not limit the maximum range of communication between a base station 20 and a target device 10.

Figure 8:
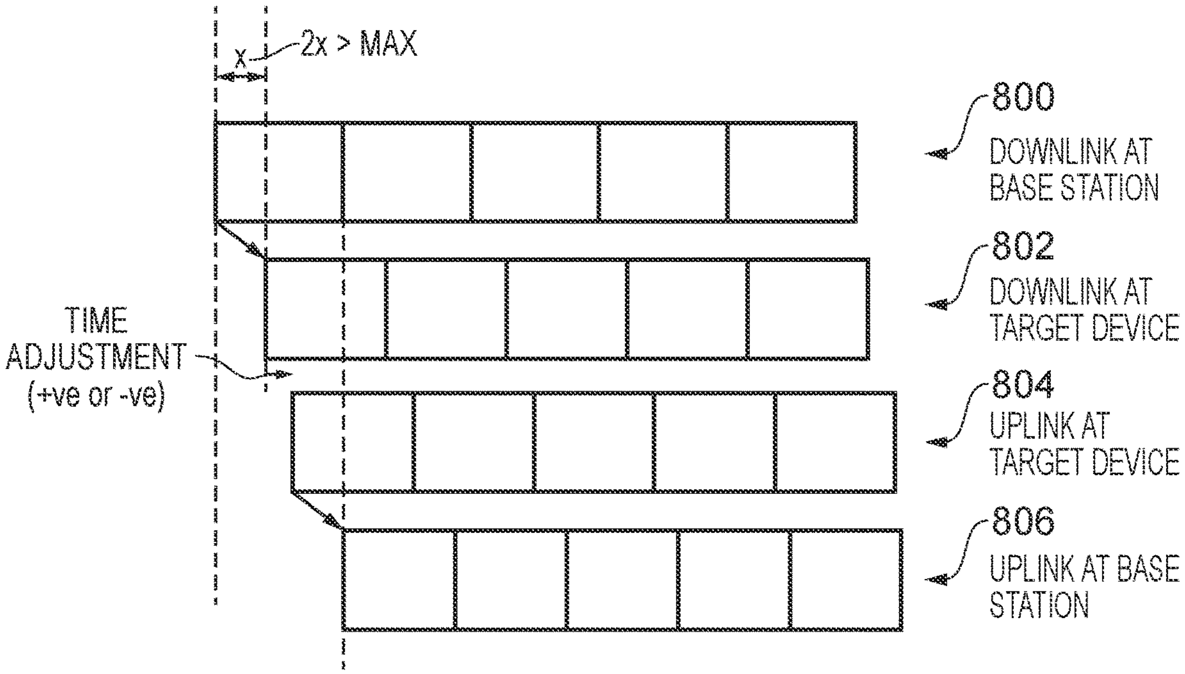
FIG. 8 illustrates a time adjustment procedure for messages transmitted between a base station apparatus and a target communication apparatus which causes an uplink message to be received delayed with respect to a downlink message.
Figure 9:
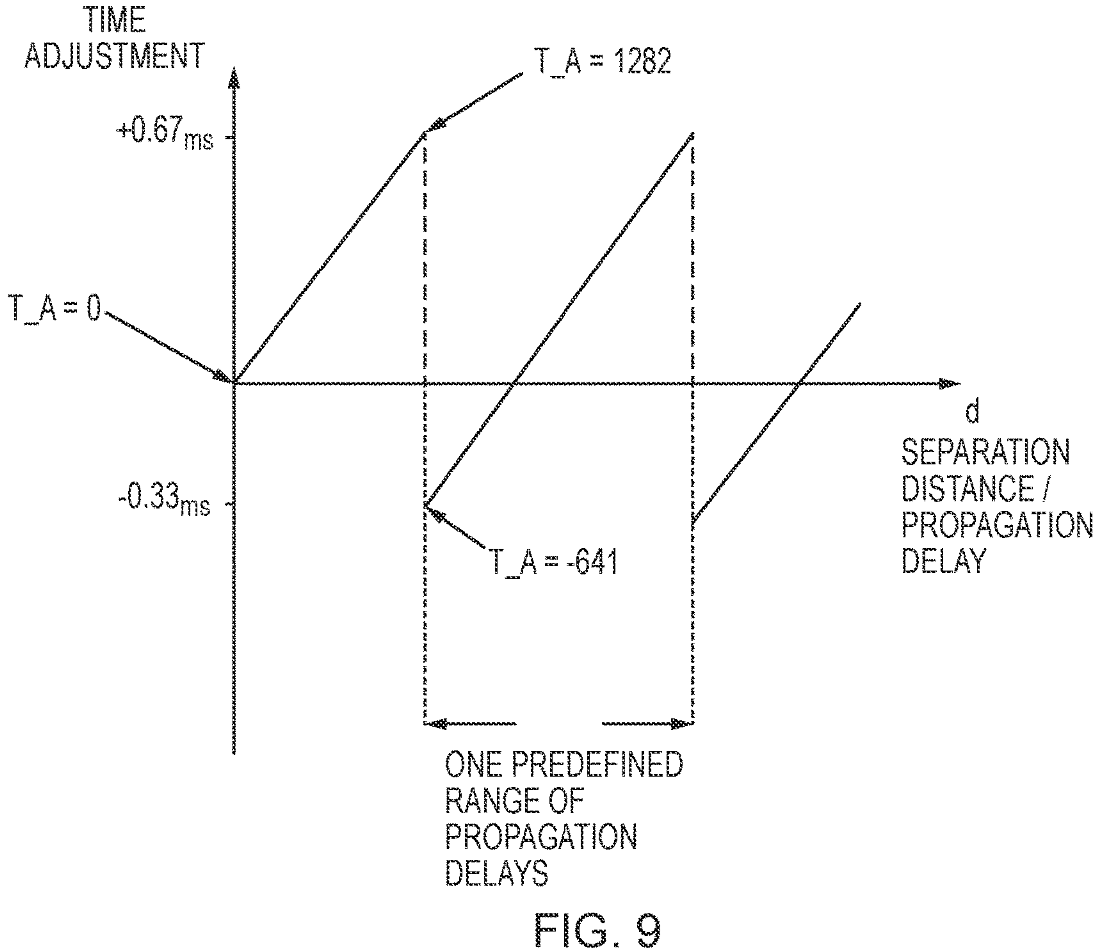
FIG. 9 illustrates a relationship between propagation delay and timing adjustment.

FIGS. 8 and 9 illustrate a technique in which a finite time adjustment can be used to mitigate the effects of propagation delay even over infinite distances (although it will be appreciated that other range-limiting effects such as maximum transmission power will limit range in real-life applications). This is achieved by, instead of aligning uplink messages with one given reference boundary as in FIGS. 5 and 6, aligning uplink messages with a reference boundary chosen based on which of a plurality of defined ranges the indication of the propagation delay falls within. This takes advantage of the fact that interference between messages is mitigated as long as their sub-frames align, regardless of which sub-frames are aligning with each other. Whilst the approach discussed with reference to FIGS. 5 and 6 is to apply a timing advance which has the effect of removing the effects of propagation delay at the base station, to mitigate interference it is sufficient to align uplink boundaries with any reference boundaries, even if this causes propagation delay to affect the time of arrival of uplink messages.

As shown in FIG. 8, at certain distances (e.g., over 100 km) the timing delay may be larger than can be accounted for using a timing advance signalled using a RAR message according to the LTE Standard, or larger than can be applied by circuitry 94 in a target device 10. For example, when the timing advance is applied with respect to downlink messages received at the target device, the round trip propagation delay may be larger than the maximum timing adjustment. Therefore, even if the maximum timing advance were applied, the uplink message may arrive delayed with respect to the downlink messages sent by the base station and other uplink messages received at the base station. However, rather than attempting to align a given boundary in the uplink message with a particular reference boundary, a smaller timing adjustment can be applied to align the uplink message with a different, later reference boundary. As shown in the fourth row 806 of FIG. 8, rather than aligning the uplink message that is received by the base station 20 with the transmitted downlink message shown in row 800, the entire uplink message may be delayed by one sub-frame with respect to the transmitted downlink message.

The time adjustment which aims to cause the uplink message to align with the reference boundaries at the base station 20 may be positive, or it may be negative. This is shown in FIG. 9. FIG. 9 illustrates an example relationship between propagation delay and timing adjustment according to an example of the present technique. The propagation delay is related to the separation between the base station and target communication apparatus (i.e., ½ round-trip propagation delay=separation distance/speed of message). The timing adjustment ranges from −0.33 ms (which corresponds to a signalled timing adjustment of $T_A$=−641 in the example given above) to 0.67 ms ($T_A$=1282). Beyond the maximum value of 0.67 ms, a time advance large enough to align with a first reference boundary may not be possible since it may exceed the capabilities of the timing adjustment application circuitry 94 or may exceed the largest value according to the message format (or, it may be possible but for other reasons, as discussed below, the maximum may be set to a particular threshold value). Therefore, a large enough time adjustment may not be signalled. However, signalling a time retard (a negative time adjustment) can allow a given boundary to align with a later reference boundary, and therefore cause alignment between boundaries in the uplink message and reference boundaries. As distance increases further, the signalled time adjustment increases, becomes positive, and again reaches the maximum. At certain distances, the time adjustment to be signalled may equal 0. This is when the separation distance causes the messages to be delayed by an amount equal to N*half of a segment in each direction, so the round trip delay is N*the length of a segment, and the uplink message arrives with boundaries aligned with transmitted downlink messages without any adjustment being applied. It will be seen that the indication of the propagation delay (corresponding to the distance axis) may fall in one of several ranges. Each range corresponds to aligning a given boundary in the uplink message to which the time adjustment has been applied with a different reference boundary when the uplink message arrives at the base station 20. For example, in the range 0-100 km (a round trip delay of 0-0.67 ms) a given boundary in the uplink message may be caused to align with a first reference boundary (for example, the time adjustment may be applied as illustrated in FIG. 5). In the range 100-250 km (a round trip delay of 0.67-1.67 ms) the given boundary may be caused to align with a second reference boundary later than and adjacent to the first reference boundary, and so on with each successive range of distances (and equivalently propagation delays). Thus, regardless of the distance, boundaries of the uplink messages received at the base station 20 can be caused to align with reference boundaries by signalling a time adjustment within a finite range of values.

After a communication session has been established between a base station and a target device (after the PRACH and RAR messages, and any subsequent session establishing messages have been sent), the target device may move. In particular, the target device may move closer to or further from the base station, which may affect the propagation delay affecting messages sent between the two devices. Timing adjustments are associated with particular propagation delays, so if the target device continues applying a previous timing adjustment to messages in the communication session, the uplink messages to which the timing adjustment has been applied which are received at the base station may no longer be aligned with the reference boundaries after the target device has moved. Therefore, in some examples, the base station may comprise circuitry (such as the propagation delay determination circuitry 84) to determine that the received uplink messages are no longer aligned with the reference boundaries. The circuitry may identify the amount by which the messages are no longer aligned. The base station apparatus may then communicate a timing adjustment update message to the target communication apparatus, the timing adjustment update message including a time adjustment update value. The target communication apparatus may then update the timing adjustment by the amount communicated in the timing adjustment update message to account for the effects of the movement of the target communication apparatus. The timing adjustment update message may or may not be a standalone message, and may be encoded as part of other messages sent to the target communication apparatus. In one example, the timing adjustment updates are provided using a Timing Advance MAC Control Element included as part of a MAC header. For example, the Timing Advance MAC Control Element may include a 6-bit timing advance command which encodes a value from 0 to 63. The signalled value of the timing adjustment update may be determined from the encoded value $T_{Aupdate}$ as $T_{Anew}=T_{Aold}+(T_{Aupdate}-31)$ (with the timing adjustment being $T=T_A*16*T_S$). Therefore, $T_A$ may be increased or decreased by an amount depending on the signalled timing adjustment update. The target communication apparatus may comprise time adjustment update circuitry 96 for applying the time adjustment update.

Simply applying the timing adjustment update may cause the timing adjustment to exceed the finite range of time adjustment values. For example, if a target device is at 100 km and has a time adjustment given by a value of $T_A$=1282 (which in some examples may be the maximum value, corresponding to a time advance of 0.67 ms), then if the device moves further away and the base station signals an update to increase $T_A$ by, for example, 17 (If $T_{Anew}$ is equal to $T_{Aold}$+17, then this can be achieved by signalling a value of $T_{Aupdate}$=17+31=48) then the updated value $T_A$=1299 may exceed the maximum time adjustment (see FIG. 9). A similar consideration would apply if the timing adjustment were at the minimum value (e.g., $T_A$=−641) and the time adjustment update sought to reduce the timing adjustment, moving the timing adjustment beyond the minimum value. To address these issues whereby timing adjustment updates may cause the timing adjustment to exceed the timing adjustment ranges, the target communication device may comprise circuitry to apply the timing adjustment update to generate an intermediate timing adjustment, determine whether the intermediate timing adjustment is within the permitted range and, if the intermediate timing adjustment exceeds the minimum or maximum allowed value for the timing adjustment, calculate a new timing adjustment which lies within the range. In order for the new timing adjustment to have the same effect of aligning the uplink messages at the base station, the new and old timing adjustments may be calculated to differ by an amount equal to the size of the predetermined range of time adjustment values, or an amount of time equal to the length of one sub-frame of the uplink messages (in certain cases these values may be equal).

In an example where $T_{Amax}$=1282 (the largest time advance is approximately 0.67 ms) and $T_{Amin}$=−641 (the largest time retard is approximately −0.33 ms), the size of the range of $T_A$ is 1924 (the size of the range when converted to time is 1 ms, equal to the length of a sub-frame). Therefore, an updated time adjustment value can be calculated as $T_{Anew}=((T_{Atemp}+641)\bmod 1924)-641$ where $T_{Atemp}=T_{Aold}+(T_{Aupdate}-31)$. More generally, for a minimum value of D and a range of R, the time adjustment value can be calculated as $T_{Anew}=((T_{Atemp}-D)\bmod R)+D$. In the above example where $T_{Atemp}$=1299, this leads to $T_{Anew}$=−625 (which lies within the range of allowed time adjustments since it is between −641 and 1282). Updating the time adjustment in this manner can allow the uplink messages to which the updated time adjustment has been applied to align with reference boundaries at the base station 20 (although since $T_{Anew}$ and $T_{Atemp}$ may be offset, the updated time adjustment does not necessarily cause the uplink message to align with the same reference boundary as the previous time adjustment) whilst remaining within a finite range of time adjustment values.

The point at which the base station apparatus chooses to switch from causing uplink messages to align with a first reference boundary to aligning with a second reference boundary (i.e., the range limits) may be adjusted. For example, if the circuitry and response message allow a larger time advance can be applied, then the limit may be larger. In some cases, as shown in FIG. 10B, if a large enough time adjustment can be signalled (a time adjustment equal to at least the length of one sub-frame, 1 ms in the LTE example) then negative time adjustments may not be necessary and the aligning effect can be achieved using entirely positive time adjustments. Likewise, the technique can be achieved using only negative time adjustments. However, using both positive and negative time adjustments means that the magnitude of time adjustment that needs to be signalled and applied is smaller than if only positive or negative time adjustments were made. For example, a positive time adjustment of 0.7 ms may have a similar aligning effect to a negative time adjustment of 0.3 ms (although they will cause alignment with different reference boundaries), but the 0.3 ms time adjustment requires the timing of uplink messages to be adjusted by a smaller amount.

The use of 0.67 ms as the maximum time adjustment may allow the technique to be used on older equipment and with the same format of messages as the alternative technique shown in FIGS. 5 and 6 (in some of the encoding discussed below, use of a smaller maximum may cause inconsistency whereby the value can be interpreted as either a positive value or a negative value based on whether the target apparatus supports applying negative time adjustments).

Nevertheless, using different boundaries between ranges may be useful when communicating with devices at certain ranges. In particular, if a target device is at a range near to one of the boundaries, then relatively small movement of the device closer to or further from the base station may cause the target device to repeatedly cross the boundary. The timing adjustment update may be signalled to the target device as discussed above, causing the timing adjustment to cross over a range limit. On one side of the range limit, the timing adjustment causes a given boundary in the uplink messages to align with a first boundary at the base station, and on the other side of the range limit the timing adjustment causes the given boundary to align with a different, second boundary at the base station. Therefore, when the device crosses the range limit, the entire uplink message becomes shifted by an integer number of sub-frames at the base station. If the base station is not adequately prepared for the shift, this may cause a temporary loss of the information communicated in those sub-frames which are received at the base station as the shift takes place, or even a complete loss in the communication session between the base station and the target communication apparatus. It may therefore be advantageous to minimise the chance of a target communication apparatus being located at a distance which corresponds to a propagation delay near to the limit between two ranges. This can be achieved by adjusting the limits of the ranges, by changing the maximum and minimum values of the time adjustment. The adjustment of ranges may be restricted by the maximum time adjustment which can be signalled and/or applied by the system, but there may nevertheless be some freedom to adjust the limits.

Figure 10A:
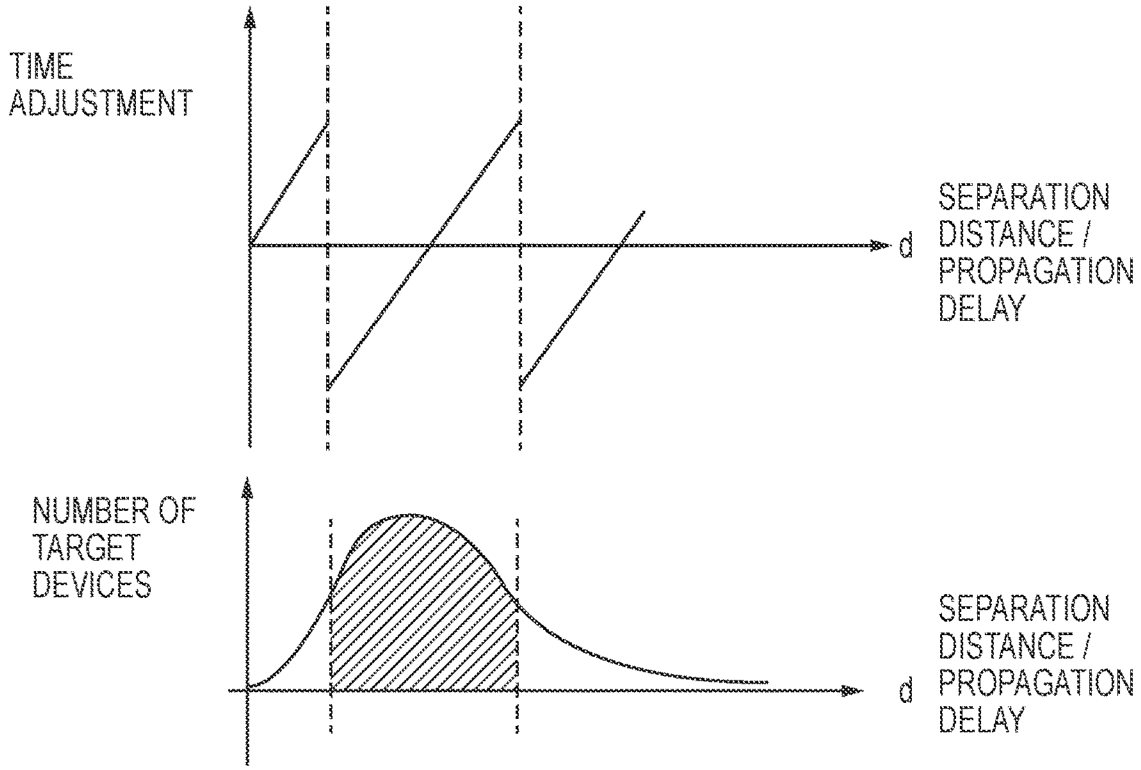
FIGS. 10A and 10B illustrate example propagation delay ranges selected in dependence on an expected distribution of target communication apparatuses.
Figure 10B:
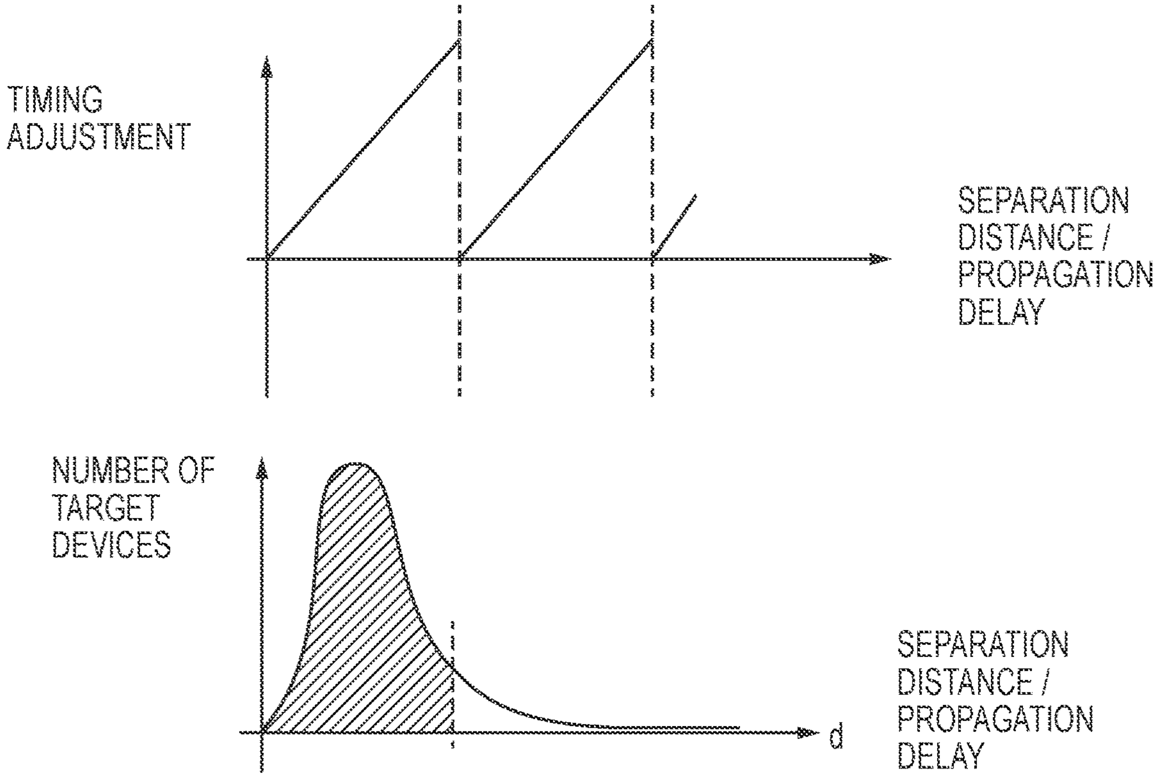

Examples are shown in FIGS. 10A and 10B. Each Figure shows two graphs. The top graph in each Figure illustrates the relationship between propagation delay (which is equivalent to the separation distance between the base station and the target communication apparatus) and signalled time adjustment. It will be seen that at certain values of the propagation delay, the signalled time adjustment changes from a maximum value to a minimum value to cause uplink messages to be aligned with a later reference boundary.

The bottom graph in each Figure illustrates an expected distribution of target communication devices in communication with the base station. This distribution may be fixed or may be variable, and may vary between different base stations based on the typical distance devices are located from that base station. The base station may collect information from the propagation delay determination circuitry 84 to construct the expected distribution of target devices, or the information may be predetermined and provided to the base station apparatus. For example, the information defining the expected distribution could be stored in storage circuitry 88 of the base station apparatus 20. It will be seen that the example expected distributions of target devices show peaks in user device density at certain distances. In the examples of FIGS. 10A and 10B, the limits between ranges of propagation delays have been determined to maximise the number of target devices which fall within a single range of propagation delays, and to minimise the number of devices falling near to a limit between propagation delay ranges. This technique therefore seeks to minimise the number of devices which are required to transition between ranges whilst undergoing normal movement, and therefore minimise the number of devices which may be adversely affected by a transition between propagation delay ranges. In each case, the time adjustment starts at 0 for 0 propagation delay (although this may not be strictly necessary as the time adjustment could be equal to an integer number of the length of each sub-frame at 0 propagation delay) and increases with increasing propagation delay until a maximum value is reached. The maximum value may be freely controllable within the limits of the base station apparatus and target communication apparatus, as well as the allowed message formats for the response message, and selected by the base station apparatus 20 to minimise the number of target devices located near to a range limit. At the maximum value, the time adjustment then encounters a discontinuity equal in size to an integer number of sub-frames, before again rising with increasing propagation delay. As shown in the comparison between FIGS. 10A and 10B, the timing adjustment may be entirely positive or it may be a combination of positive and negative (timing advances and timing retards). Although not shown, it may also be entirely negative (for example, starting at a negative value equal in magnitude to the length of an integer number of sub-frames).

As discussed above, the maximum time adjustment value $T_{Amax}$ may be adjusted by the base station apparatus (for example, to reduce the likelihood of target communication devices from being located near to the limits between ranges). Since the target communication apparatus updates the time adjustment in dependence on the maximum and minimum limits of the time adjustment value, as indicated above, in some examples the base station apparatus may communicate a value to the target communication apparatus indicative of this range. This can be useful for the first time a particular target communication apparatus communicates with a particular base station, or if the ranges are modified during a communication session, so that calculations are performed using the correct range of time adjustment values. As will be discussed below, it can also be important to know the maximum time adjustment value for decoding a time adjustment value from a RAR message. The time adjustment limits may be communicated in several ways. For example, a maximum time adjustment value may be communicated (with the size of the range being implied, or in addition to the size of the range being communicated) or a minimum time adjustment may be communicated.

The time adjustment determination circuitry 86 calculates a time adjustment based on an indication of a propagation delay. In some examples, the time adjustment determination circuitry 86 may use a relationship such as that illustrated in FIG. 9 for determining which timing adjustment is associated with the indication of the propagation delay provided by the propagation delay determination circuitry 84. The relationship may be based on an equation relating the two variables, for example. Information defining the relationship may be stored in storage circuitry 88, which the time adjustment determination circuitry 86 may reference to determine a time adjustment.

As discussed above, an example message format for signalling the time adjustment is illustrated in FIG. 7. In this example message, the Timing Advance Command field 100 comprises 11 bits. The use of 11 bits allows the signalling of a positive value between 0 and 2047. However, the message may be constrained by a standard (e.g., the LTE Standard) to signal a maximum value, such as 1282. In this example, 1282 would be signalled using all 11 bits of encoding space (as 10100000010) which therefore does not leave an entire free bit to use as a sign bit if the same field is to be used to also signal negative values. However, there may be encoding space available between a threshold value corresponding to the largest positive time adjustment and the theoretical maximum signalled value. Therefore, in some examples, negative time adjustments can be signalled as positive time adjustments larger than the threshold value, making use of the available encoding space without requiring an additional sign bit. For example, the target communication apparatus could decode the timing adjustment as follows:

$$T_{SA} = \begin{cases} T_A, & \text{if } T_A \le T_{Amax} \\ T_{Amax} - T_A, & \text{otherwise} \end{cases}$$

In the examples given above, $T_{Amax}$=1282, and the range of $T_A$ is from −641 to 1282, so the largest value that will need to be signalled is 1923, which will fall within the range of values representable with 11 bits. It will be appreciated that the details of the specific examples given are not required, and the example is merely used to illustrate that negative timing adjustments can be encoded as positive timing adjustments larger than a threshold value. This technique is particularly useful when there is sufficient space in the encoding of a message to encode the negative timing adjustments between the threshold and the maximum representable value, but not sufficient space to provide a spare bit to use as a sign bit. This takes advantage of spare encoding space in a format which may be restricted by a Standard.

FIG. 7 also illustrates a reserved bit 102 in the encoding of the RAR message. This may be provided in certain prescribed message formats, such as the format of a RAR message according to the LTE (4G) and NR (5G) Standards of 3GPP. In certain embodiments, the reserved bit may be unused for other purposes, and therefore may be free to use for encoding the timing adjustment.

Therefore, the reserved bit may be treated as an additional bit which can be combined with the 11 bits of the Timing Advance Command field 100 to provide a 12 bit field for encoding a signed timing adjustment. In particular, if the maximum signalled value of the timing adjustment requires only 11 bits (e.g. if the maximum signalled value is 1282), then there is an unused bit in the extended field which may be used to represent the sign of the value. When the reserved bit takes its usual value (the value it would take if unused for the timing adjustment value), then the value in the timing advance command field may be interpreted by the target communication apparatus as a positive value. This allows backwards compatibility with previous message formats, since positive time adjustments can be interpreted as they would be if negative time adjustments were not provided for. However, when the reserved bit 102 takes a different value, then the value encoded in the 11 bits of the timing advance command field 100 may be interpreted as a negative value (e.g., a value between 0 and −2047). This therefore enables the RAR message format to be used to encode both positive and negative timing adjustments.

Further, rather than using the additional bit 102 to signal the sign of the value in the field 100, the bit 102 could be concatenated with the field 100 to provide a 12 bit field, and the timing adjustment could be calculated as a two's complement value. The two's complement timing adjustment could then be encoded in the 12 bit extended field, and used for transmitting both positive and negative timing adjustments.

In this way, both a positive and negative timing adjustment can be communicated from the base station to a target communication apparatus using an existing message format.

Figure 11:
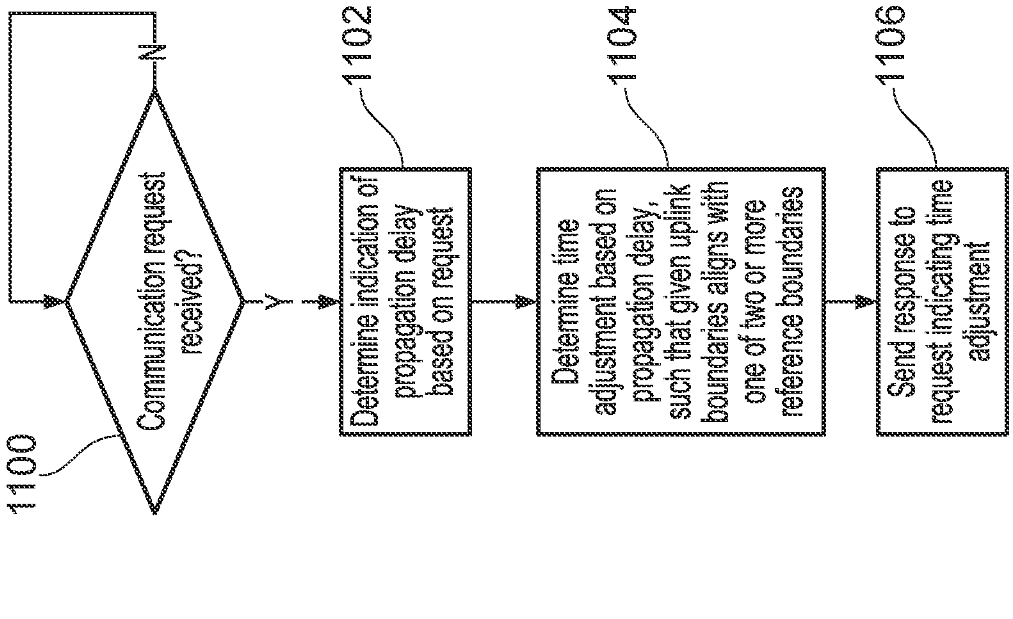
FIG. 11 illustrates a process performed by a base station apparatus during establishment of a communication session.

FIG. 11 illustrates a process performed by the base station apparatus 20 during the establishment of a communication session. At step 1100, the base station apparatus 20 determines whether a request to establish a communication session has been received from a target communication apparatus 10 at the antenna circuitry 80. For example, the request may be a PRACH message according to a 3GPP Standard. If no request is received, the process remains at step 1100 until a request is received. If a request is received, then at step 1102, propagation delay determination circuitry 84 is used to compare the timing of the PRACH message to a predetermined time to determine a level of delay encountered by the PRACH message between being transmitted by the target communication apparatus and being received at the base station apparatus 20. At step 1104, the time adjustment determination circuitry uses the indication of the propagation delay determined at step 1102 to calculate a time adjustment to be signalled to the target communication apparatus 10. For example, the determination may be based on information stored in storage circuitry 88 which associates each indication of the propagation delay with a time adjustment. In particular, at step 1104, the time adjustment is determined such that boundaries in the uplink message received at the base station apparatus 20 will be aligned with reference boundaries, and the reference boundary to which a particular uplink boundary aligns depends on which of a plurality of ranges the propagation delay lies within. At step 1106, the calculated time adjustment is transmitted to the target communication apparatus in a response to the request. For example, the response may be a RAR message according to a 3GPP Standard.

Figure 12:
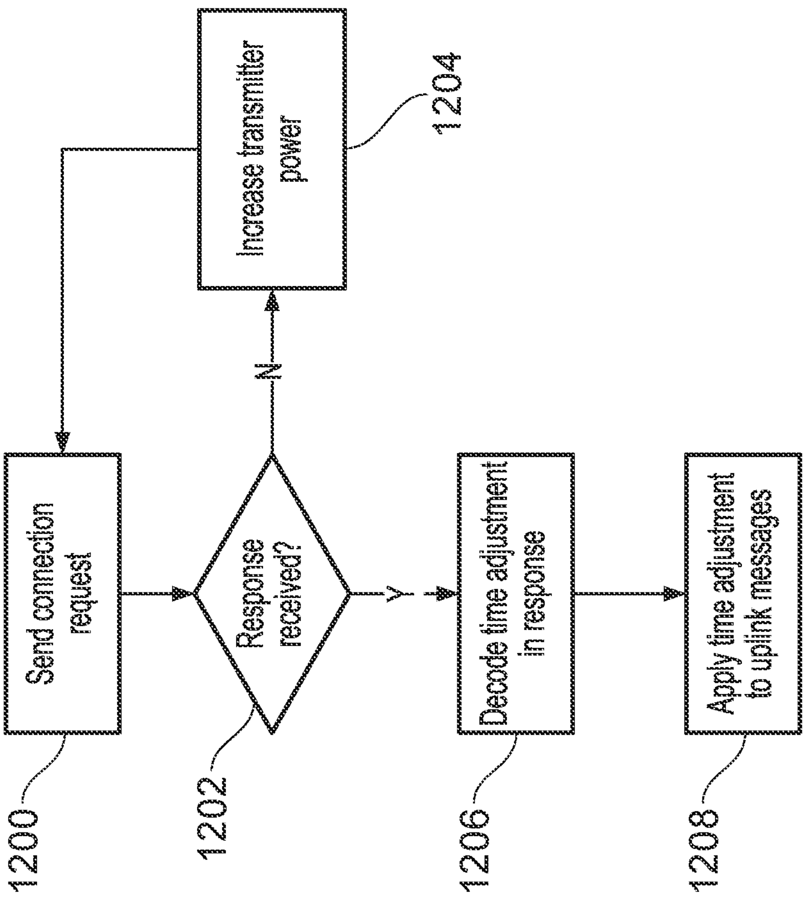
FIG. 12 illustrates a process performed by a target communication apparatus during establishment of a communication session.

FIG. 12 illustrates a process performed by a target communication apparatus during the establishment of a communication session. At step 1200 a connection request, such as a PRACH message, is transmitted to a base station 20 by antenna circuitry 90. At step 1202 it is determined whether a response to the request has been received. If no response is received within a predetermined period of time, then at step 1204 the power of the antenna circuitry 90 is increased and the process returns to step 1200. If the power is already at a maximum value, then the process may be aborted. If response is received from the base station apparatus 20, then at step 1206 the response message is decoded. In particular, a time adjustment value is decoded from the response message. The time adjustment may be decoded from the Timing Advance Command field of a RAR message, for example, in some cases also using a reserved bit. At step 1208, time adjustment application circuitry 94 in the target communication device 10 applies a time adjustment according to the decoded time adjustment value to future uplink messages transmitted to the base station 20 as part of the communication session. The adjustment is applied as an offset with reference to boundaries in downlink messages received at the target communication apparatus. The time adjustment may be positive (shifting the uplink messages earlier in time) or it may be negative (shifting the uplink messages later in time).

Figure 13:
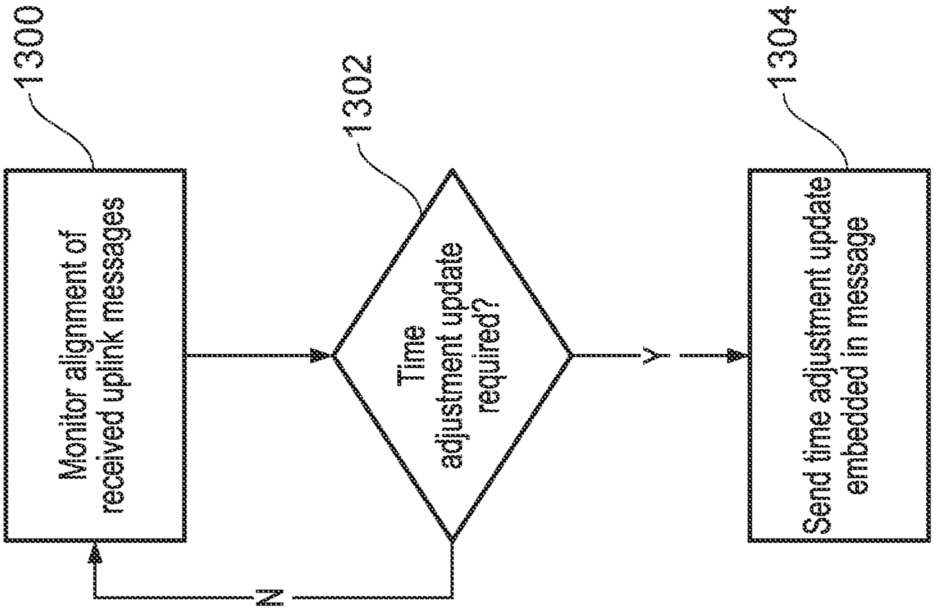
FIG. 13 illustrates a process performed by a base station apparatus for updating a time adjustment during a communication session.

FIG. 13 illustrates a process performed by the base station apparatus for updating the time adjustment applied by the target communication apparatus. At step 1300, the base station apparatus monitors the alignment of uplink messages to which the time adjustment has been applied which are received at the antenna circuitry 80 from a target communication apparatus 10. In particular, the base station apparatus determines whether boundaries between sub-frames in the uplink message align with reference boundaries, in particular boundaries between downlink messages transmitted by the antenna circuitry 80. Whilst there may be a small amount of freedom for variation in alignment (alignment does not necessarily have to be exact), the base station apparatus can determine whether the alignment requires updating due to movement of the target communication apparatus. If it is determined at step 1302 that the time adjustment requires updating, then at step 1304 the base station apparatus communicates a time adjustment update value to the target communication device 10. The time adjustment value may indicate an amount of time equal to the amount by which the alignment is out, so that once the time adjustment has been applied, uplink messages to which the adjustment has been applied will again be aligned with the reference boundaries.

Figure 14:
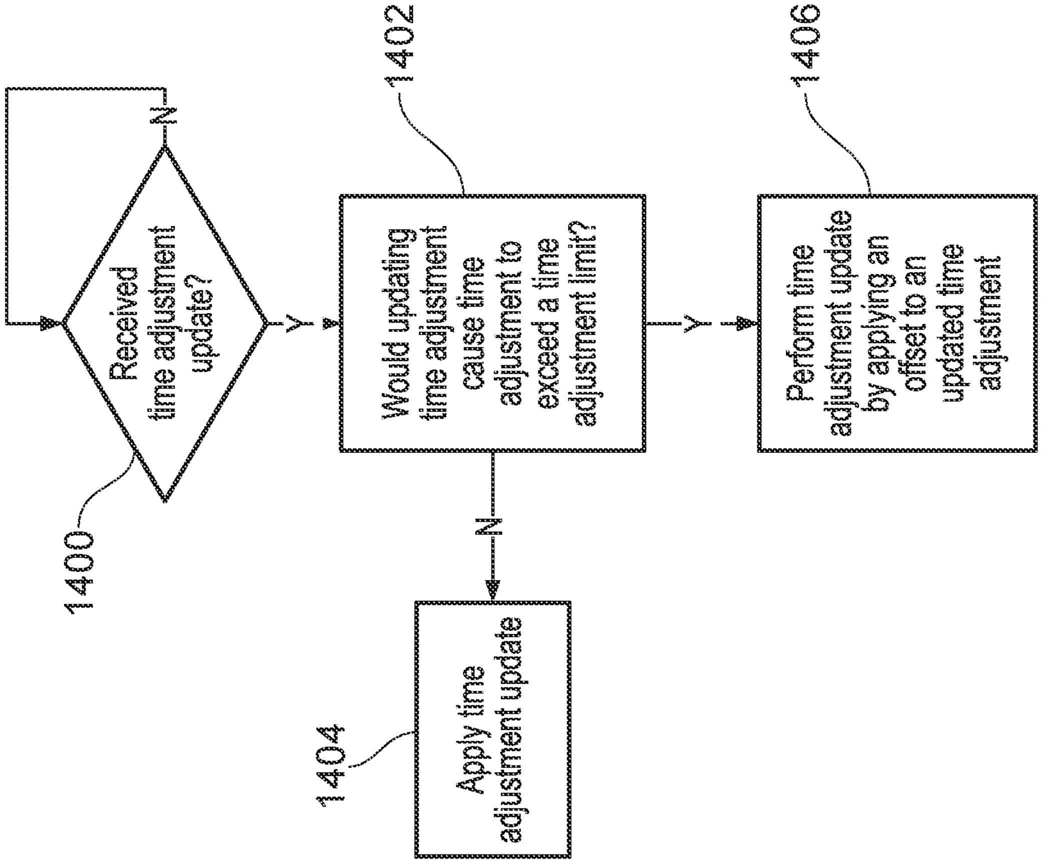
FIG. 14 illustrates a process performed by a target communication apparatus for updating a time adjustment during a communication session.

FIG. 14 illustrates a process for a target communication apparatus for updating the time adjustment. At step 1400, the target communication apparatus determines whether it has received a message indicating a time adjustment update. If a time adjustment update message has been received, then a time adjustment update value is decoded from the time adjustment update message. At step 1402 it is determined whether the time adjustment update circuitry 96 applying the time adjustment update to the time adjustment being used by the time adjustment application circuitry 94 would cause the time adjustment to exceed a limit (such as the maximum or minimum time adjustment illustrated in FIG. 9). If not, then the time adjustment is updated according to the time adjustment update value at step 1404. However, if applying the update would cause the time adjustment to exceed a limit, then at step 1406 the time adjustment update is applied and the resulting intermediate value is then offset by an amount equal to an integer number of sub-frames to a value within the allowable time adjustment limits. The time adjustment application circuitry 94 then applies the updated time adjustment to future uplink messages sent by the target communication apparatus as part of the communication session.

Figure 15:
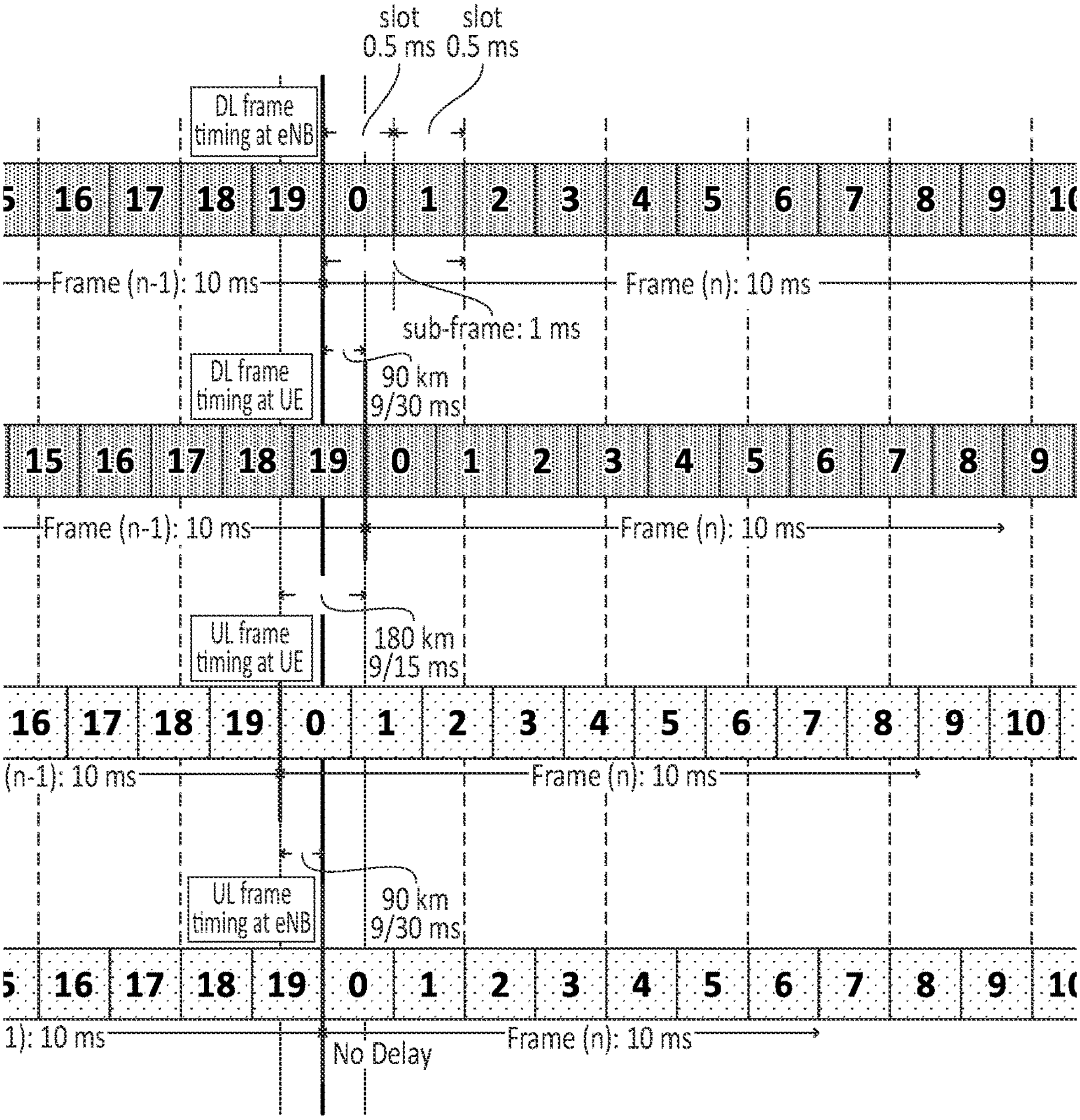
FIGS. 15, 16, 17, 18, 19 and 20 illustrate examples of applying a timing adjustment to an uplink message to cause alignment of temporal segments with reference boundaries.
Figure 16:
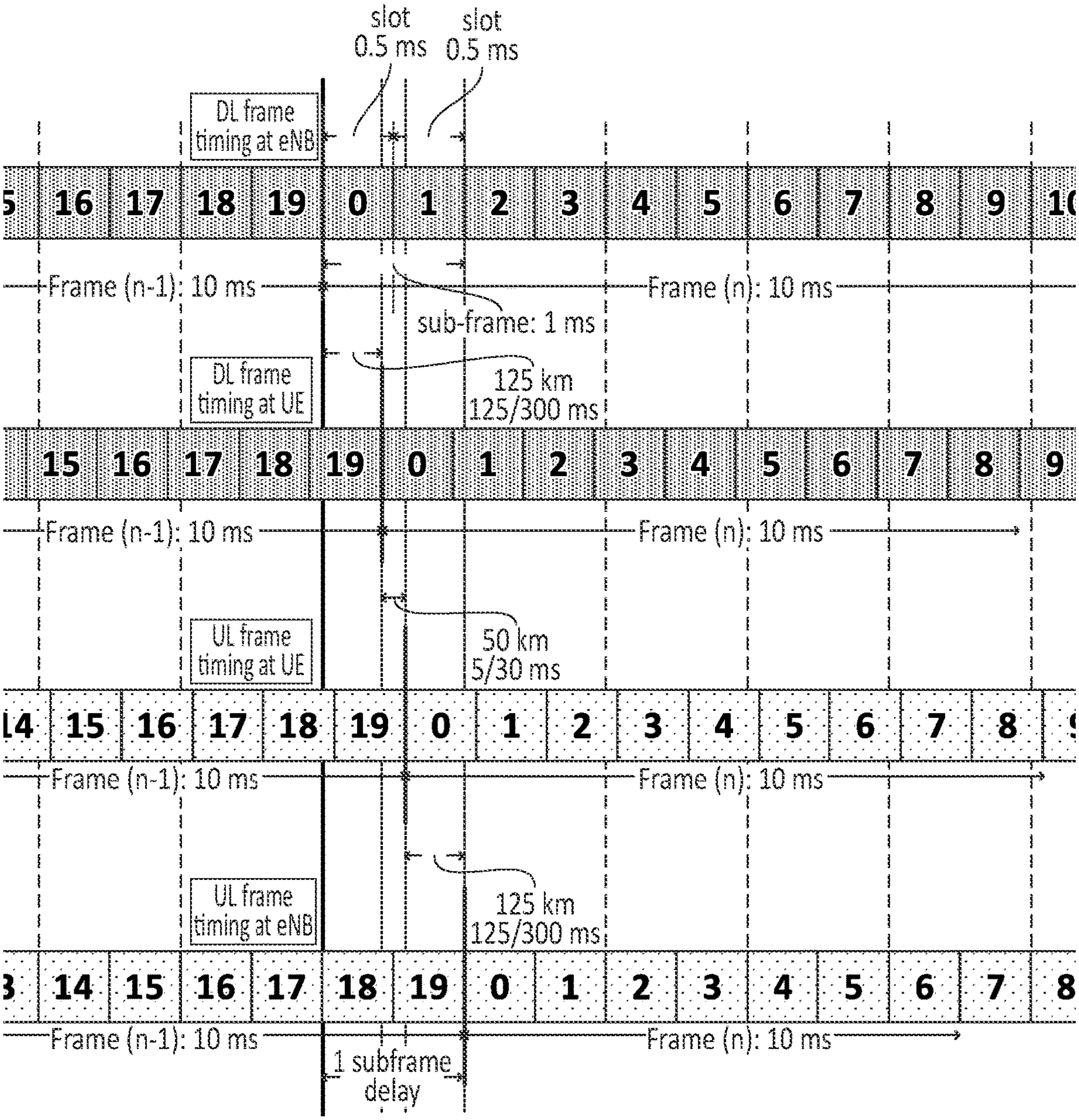
Figure 17:
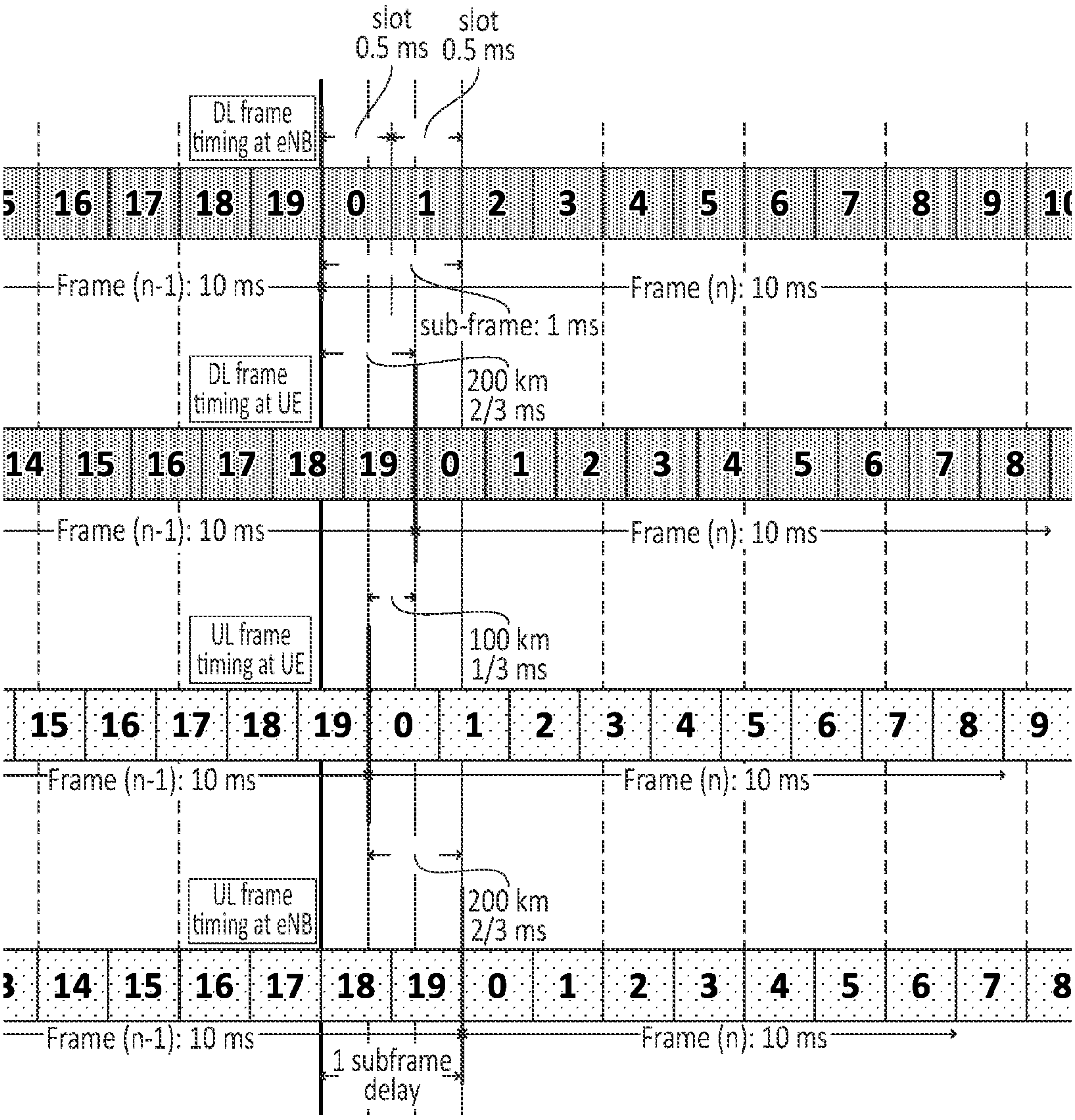
Figure 18:
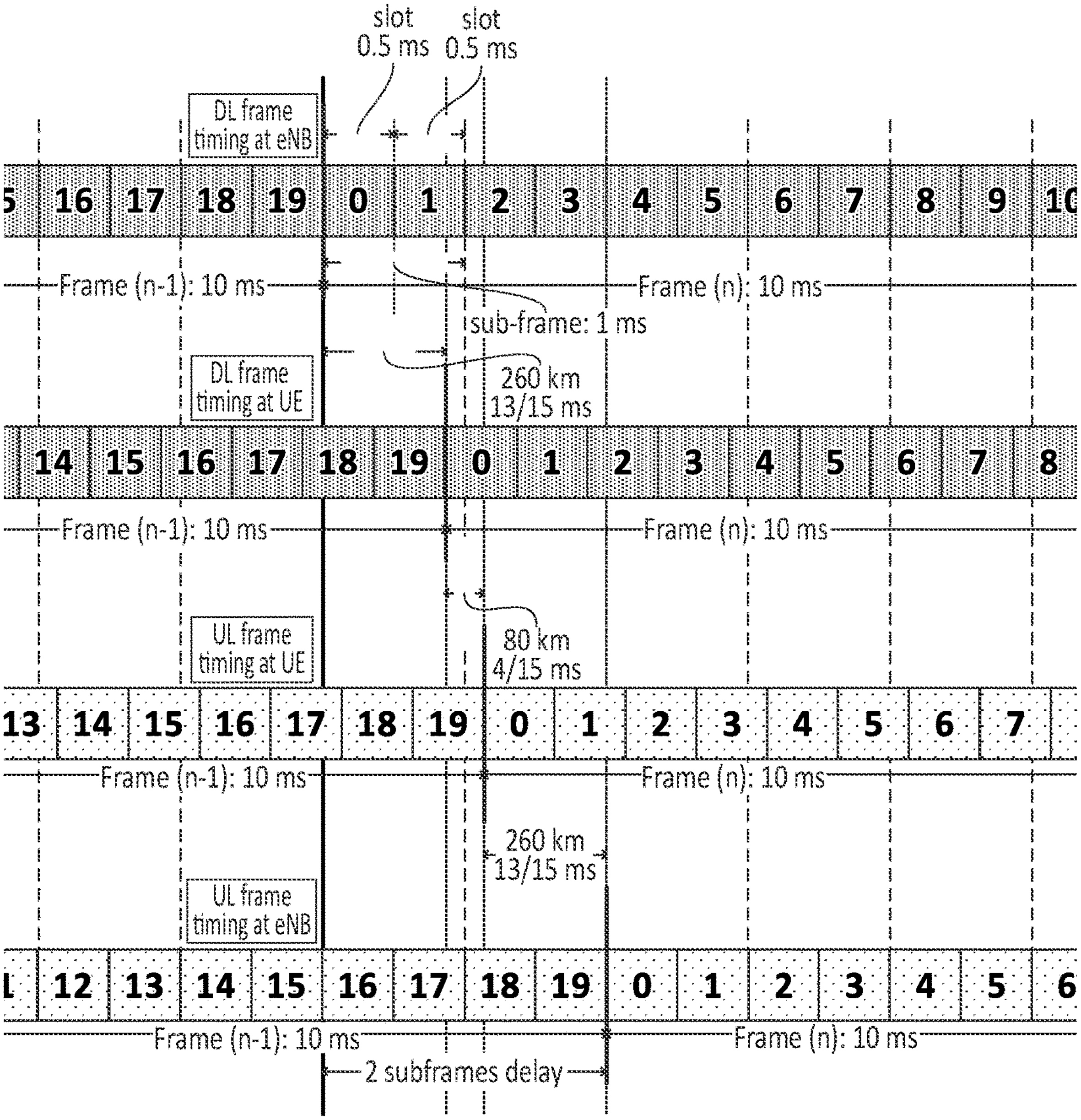
Figure 19:
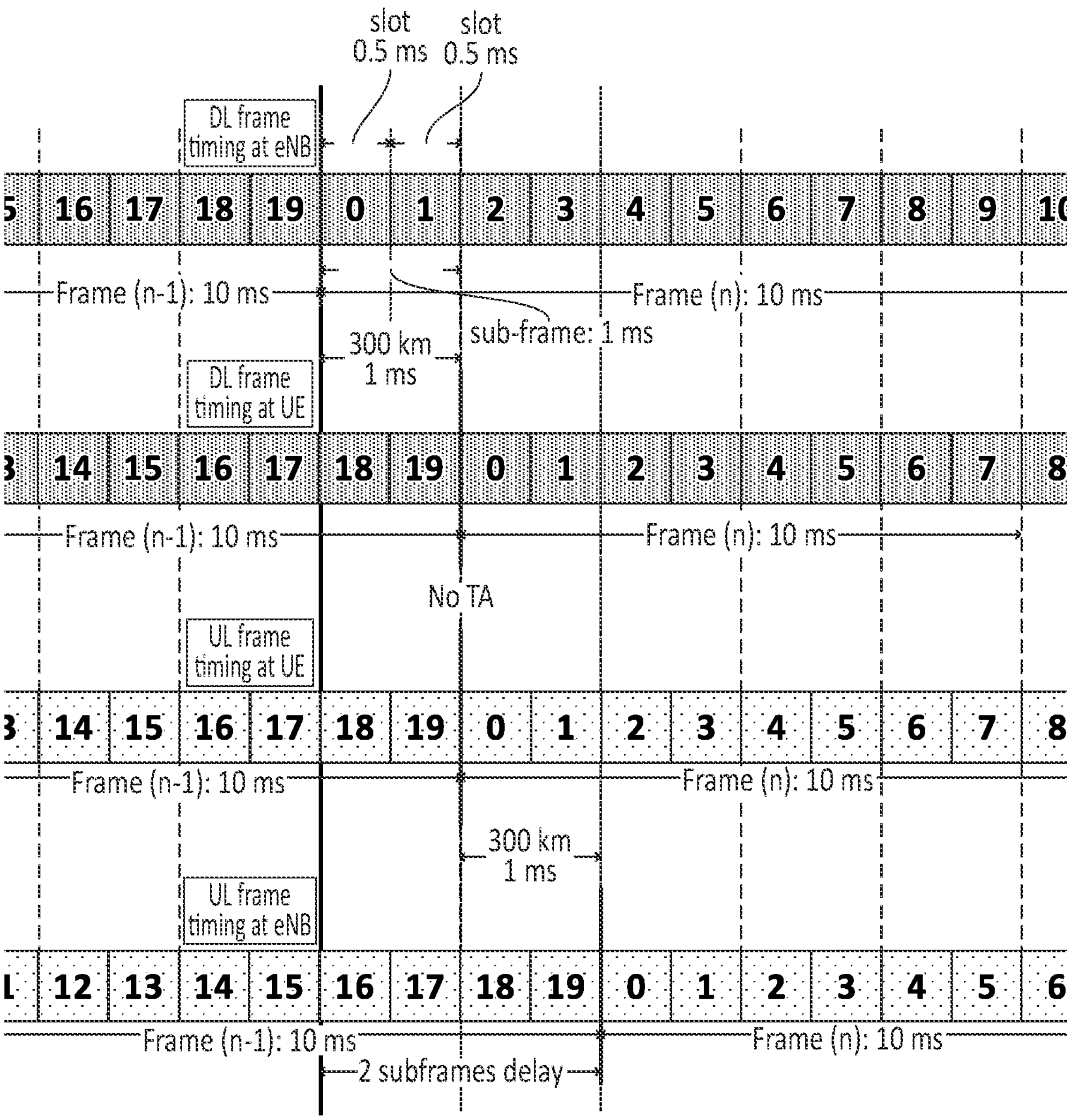
Figure 20:
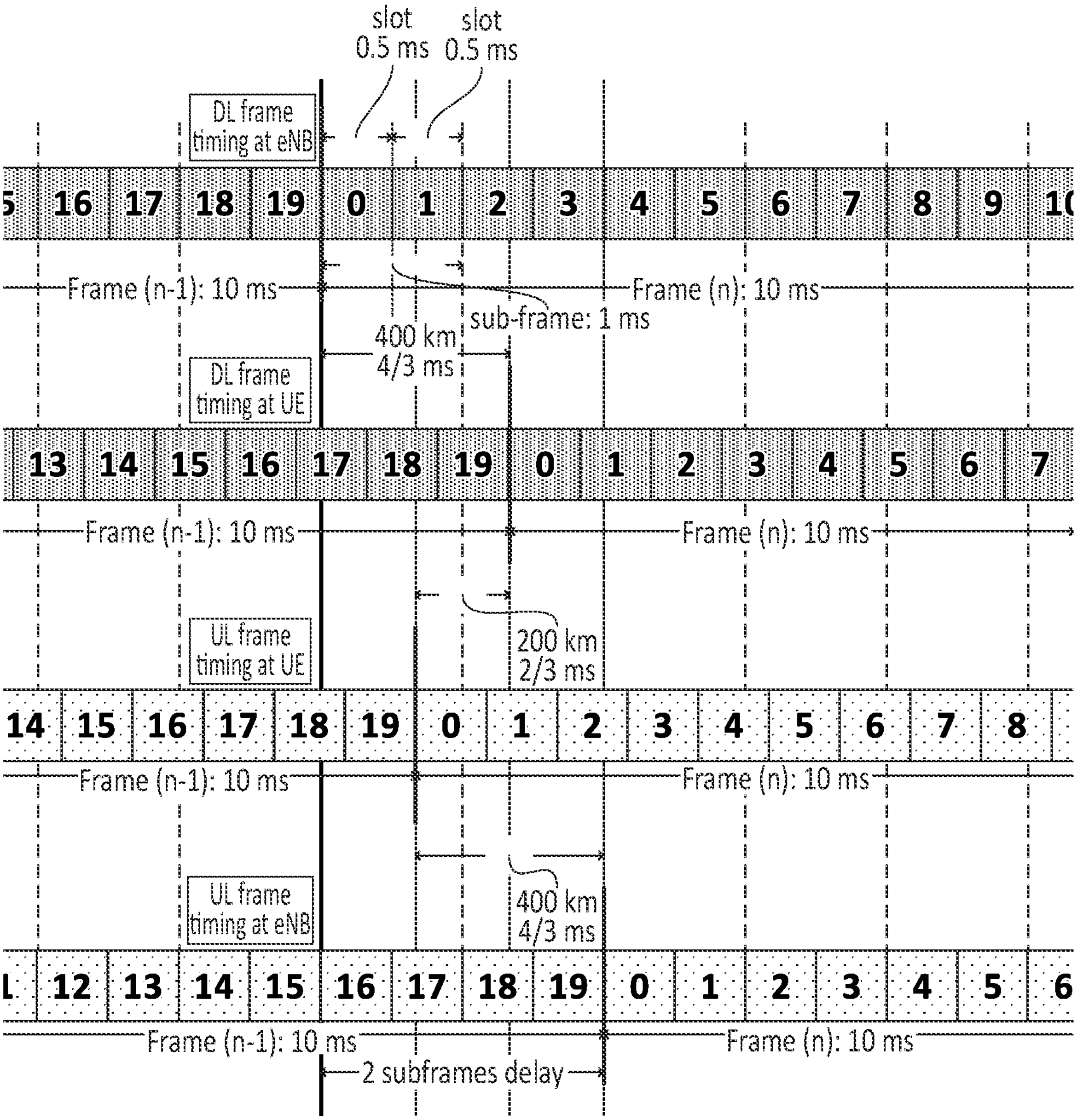

FIGS. 15-20 provide further examples of the present technique. In each case, the timing of downlink (DL) and uplink (UL) messages are shown as received at and transmitted from a base station (eNodeB, eNB) and a target communication apparatus (user equipment, UE). In the examples provided, the time adjustment is applied between the second and third rows, and is equal to $T=T_A*16*T_S$ as described above (with $T_A$ also being referred to as a signed timing adjustment (STA)). In FIG. 15, a timing advance is applied to align the uplink messages with a first reference boundary to remove the effect of the propagation delay (the uplink message arrives with no delay compared to transmitted downlink messages). In FIG. 16, a timing retard is applied to delay the uplink message and cause alignment between a given boundary in the uplink message (e.g., the boundary before the first sub-frame) and a given reference boundary which is later than in the example of FIG. 15. Therefore, alignment has been achieved and a 1 sub-frame delay has been introduced. Note that one sub-frame is indicated as two parts in the examples of FIGS. 15-20, each part comprising one slot according to the 3GPP Standards, and therefore two numbered sections of the message correspond to one sub-frame. FIG. 17 illustrates an example in which a 1 sub-frame delay is introduced with a positive timing adjustment. FIGS. 18-20 illustrate examples in which a 2 sub-frame delay is introduced with a negative timing adjustment, zero timing adjustment, and positive timing adjustment respectively. It will be seen that alignment can be achieved between sub-frame boundaries of uplink and downlink messages even beyond 100 km with this technique.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A base station apparatus, comprising:

antenna circuitry configured to, during a communication session, transmit downlink messages to a target communication apparatus and receive uplink messages from the target communication apparatus, wherein the downlink and uplink messages comprise temporal segments with respective ranges and boundaries between the temporal segments;

propagation delay determination circuitry configured to determine an indication of a propagation delay in messages sent between the base station apparatus and the target communication apparatus based on a request, received from the target communication apparatus, to initiate a communication session with the base station apparatus; and time adjustment determination circuitry configured to determine a time adjustment of an uplink message based on the propagation delay, wherein the time adjustment is communicated to the target communication apparatus in response to the request, wherein, when the uplink message, to which the time adjustment is applied, is received at the base station apparatus, the boundaries between the temporal segments in the received uplink message align with reference boundaries and wherein a reference boundary, which aligns with a given boundary within the received uplink message to which the time adjustment has been applied, is selected based on the propagation delay being within a range between two boundaries in the received uplink message.

2. The base station apparatus according to claim 1, wherein first and second time adjustments determined for indications of the propagation delay being within adjacent ranges are determined such that the given boundary within an uplink message to which the first time adjustment has been applied and the given boundary within an uplink message to which the second time adjustment has been applied align with adjacent reference boundaries.

3. The base station apparatus according to claim 1, wherein a difference between a minimum time adjustment corresponding to the smallest indication of the propagation delay in a given defined range and a maximum time adjustment corresponding to the largest indication of the propagation delay in the given defined range is equal to a length of one temporal segment.

4. The base station apparatus according to claim 1, wherein range limits of the ranges are set in dependence on an estimated distribution of target communication apparatuses.

5. The base station apparatus according to claim 4, wherein the range limits are selected to seek to maximise a number of target communication apparatuses for which the indication of the propagation delay being within a single range having regard to the estimated distribution of target communication apparatuses.

6. The base station apparatus according to claim 1, wherein the time adjustment determination circuitry is configured to determine a time adjustment that can take either a positive value corresponding to a time advance or a negative value corresponding to a time retard.

7. The base station apparatus according to claim 6, wherein the time adjustment determination circuitry is configured to determine a maximum positive time adjustment which is equal to the largest time advance representable in an encoding of a Random Access Response message according to a 3GPP Standard.

8. The base station apparatus according to claim 6, wherein in an encoding of a response to the request, a negative time adjustment is encoded as a positive time adjustment with a magnitude larger than a threshold value;

wherein the threshold value corresponds to a maximum positive time adjustment.

9. The base station apparatus according to claim 6, wherein in an encoding of a response to the request, a negative time adjustment is encoded as a positive time adjustment having a same magnitude as the negative time adjustment, and an additional bit is set to indicate a sign of the time adjustment value.

10. The base station apparatus according to claim 6, wherein in an encoding of a response to the request, the time adjustment is encoded as a two's complement value in a field including an additional bit.

11. The base station apparatus according to claim 9, wherein the response to the request is a Random Access Response message according to a 3GPP Standard, wherein a positive time adjustment is encoded in a Timing Advance Command field and the additional bit is a reserved bit.

12. The base station apparatus according to claim 1, wherein the time adjustment determination circuitry is arranged to determine a time adjustment which is periodic with respect to the indication of the propagation delay.

13. The base station apparatus according to claim 1, wherein the antenna circuitry is configured to communicate with two or more target communication apparatuses, and wherein the time adjustment determination circuitry is arranged to use the reference boundaries to determine a time adjustment for each target communication apparatus.

14. The base station apparatus according to claim 1, wherein the reference boundaries used by the time adjustment determination circuitry are selected to align with boundaries between temporal segments in downlink messages sent from the base station apparatus.

15. The base station apparatus according to claim 1, wherein the time adjustment determination circuitry is arranged to determine a time adjustment to be applied to uplink messages by the target communication apparatus as an offset with respect to boundaries in a downlink message received at the target communication apparatus.

16. The base station apparatus according to claim 1, wherein the propagation delay determination circuitry is configured to determine an indication of the propagation delay based on an elapsed time between a reference time and receipt of the request.

17. The base station apparatus according to claim 1, wherein the uplink and downlink messages are split into temporal frames comprising two or more sub-frames, and each temporal segment corresponds to a sub-frame.

18. The base station apparatus according to claim 1, wherein the target communication apparatus is mounted on a moving vehicle.

19. A method for a base station apparatus, comprising:

during a communication session, transmitting downlink messages to a target communication apparatus and receiving uplink messages from the target communication apparatus with antenna circuitry, wherein the downlink and uplink messages comprise temporal segments with respective ranges and boundaries between the temporal segments;

determining an indication of a propagation delay in messages sent between the base station apparatus and the target communication apparatus in dependence on a request, received from the target communication apparatus, to initiate a communication session with the base station apparatus; and determining a time adjustment of an uplink message based on the propagation delay, wherein the time adjustment is to be communicated to the target communication apparatus in response to the request, wherein, when the uplink message, to which the time adjustment is applied, is received at the base station apparatus, the boundaries between the temporal segments in the received uplink message align with reference boundaries; and wherein a reference boundary which aligns with a given boundary within the received uplink message to which the time adjustment has been applied, is selected based on the propagation delay being within a range between two boundaries in the received uplink message.

20. A base station apparatus, comprising:

communication means for transmitting, during a communication session, downlink messages to a target communication apparatus and for receiving, during the communication session, uplink messages from the target communication apparatus, wherein the downlink and uplink messages comprise temporal segments with respective ranges and boundaries between the temporal segments;

propagation delay determining means for determining an indication of a propagation delay in messages sent between the base station apparatus and the target communication apparatus in dependence on a request, received from the target communication apparatus, to initiate a communication session with the base station apparatus; and time adjustment determining means for determining a time adjustment of an uplink message in dependence on the indication of the propagation delay, wherein the time adjustment is communicated to the target communication apparatus in response to the request, wherein when the uplink message, to which the time adjustment is applied, is received at the base station apparatus, the boundaries between the temporal segments in the received uplink message align with reference boundaries; and wherein a reference boundary, which aligns with a given boundary within received the uplink message to which the time adjustment has been applied, is selected based on the propagation delay being within a range between two boundaries in the received uplink message.

* * * * *